US010054340B2

(12) United States Patent
Watanabe et al.

(10) Patent No.: US 10,054,340 B2
(45) Date of Patent: Aug. 21, 2018

(54) MAGNETO-CALORIC EFFECT ELEMENT AND THERMO-MAGNETIC CYCLE APPARATUS

(71) Applicant: DENSO CORPORATION, Kariya, Aichi-pref. (JP)

(72) Inventors: Naoki Watanabe, Nagoya (JP); Tsuyoshi Morimoto, Nagoya (JP); Takuya Fuse, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 350 days.

(21) Appl. No.: 14/508,240

(22) Filed: Oct. 7, 2014

(65) Prior Publication Data
US 2015/0096307 A1 Apr. 9, 2015

(30) Foreign Application Priority Data
Oct. 9, 2013 (JP) ................................. 2013-212272

(51) Int. Cl.
*F25B 21/00* (2006.01)
*B60H 1/00* (2006.01)

(52) U.S. Cl.
CPC ......... *F25B 21/00* (2013.01); *B60H 1/00478* (2013.01); *F25B 2321/0022* (2013.01); *Y02B 30/66* (2013.01)

(58) Field of Classification Search
CPC ............. F25B 21/00; F25B 2321/0022; B60H 1/00478; Y02B 30/66
USPC ................................................... 62/3.1, 3.7
See application file for complete search history.

(56) References Cited

U.S. PATENT DOCUMENTS

| 2,619,603 | A | * | 11/1952 | Chilowsky | .............. | F25B 21/00 310/306 |
| 3,108,444 | A | * | 10/1963 | Kahn | ...................... | F25B 21/00 62/3.1 |
| 3,125,861 | A | * | 3/1964 | Jaep | ........................ | F25B 21/00 62/3.7 |

(Continued)

FOREIGN PATENT DOCUMENTS

| JP | 2009-221494 | 10/2009 |
| JP | 2012-503754 | 2/2012 |

(Continued)

OTHER PUBLICATIONS

Office Action dated Jun. 23, 2015 in corresponding JP application No. 2013-212272 with English translation.

*Primary Examiner* — Grant Moubry
*Assistant Examiner* — Kirstin Oswald
(74) *Attorney, Agent, or Firm* — Harness, Dickey & Pierce, P.L.C.

(57) ABSTRACT

A magneto-caloric-effect element has a plurality of element units. The element units have lengths, respectively. The element units have different Curie temperatures, respectively. The element units demonstrate magneto-caloric effects. Two adjoining performance distribution crosses at a cross temperature. A temperature in the rated operational status between two adjoining element units is called a boundary temperature. The lengths and/or Curie temperatures are set so that the boundary temperatures and the cross temperatures coincide each other. Thereby, a plurality of element units can function at high effectiveness in the rated operational status.

8 Claims, 13 Drawing Sheets

(56) References Cited

U.S. PATENT DOCUMENTS

| | | | | |
|---|---|---|---|---|
| 3,430,133 | A * | 2/1969 | Greiner | G01N 27/84 324/213 |
| 4,970,866 | A * | 11/1990 | Mokadam | F25B 21/00 62/3.1 |
| 5,213,630 | A * | 5/1993 | Hashimoto | C09K 5/16 148/301 |
| 5,249,424 | A * | 10/1993 | DeGregoria | F25B 21/00 62/3.1 |
| 7,897,898 | B2 * | 3/2011 | Muller | F25B 21/00 219/672 |
| 2003/0051774 | A1 * | 3/2003 | Saito | H01F 1/015 148/302 |
| 2008/0314048 | A1 * | 12/2008 | Barve | F25B 21/00 62/3.1 |
| 2010/0236258 | A1 * | 9/2010 | Heitzler | F25B 21/00 62/3.1 |
| 2011/0048690 | A1 * | 3/2011 | Reppel | F25B 21/00 165/185 |
| 2011/0173993 | A1 | 7/2011 | Muller et al. | |
| 2012/0266591 | A1 * | 10/2012 | Morimoto | F03G 7/00 60/527 |
| 2012/0285179 | A1 * | 11/2012 | Morimoto | F25B 21/00 62/3.1 |

FOREIGN PATENT DOCUMENTS

| | | |
|---|---|---|
| JP | 2012-229634 | 11/2012 |
| JP | 2012-255642 | 12/2012 |

* cited by examiner

MAGNETO-CALORIC EFFECT ELEMENT AND THERMO-MAGNETIC CYCLE APPARATUS

CROSS REFERENCE TO RELATED APPLICATION

This application is based on Japanese Patent Application No. 2013-212272 filed on Oct. 9, 2013, the disclosure of which is incorporated herein by reference.

TECHNICAL FIELD

The present disclosure relates to a magneto-caloric effect element and a thermo-magnetic cycle apparatus using magneto-caloric effect of magnetic material. The magneto-caloric effect element and the thermo-magnetic cycle apparatus may be used as a magneto-caloric effect type heat pump apparatus.

BACKGROUND

Patent Literatures (PLT)

PLT 1: JP2012-255642A
PLT 2: JP2012-229634A
PLT 3: JP2012-503754A

PLT 1, PLT 2, and PLT 3 disclose a plurality of element units which have different Curie temperature, and are arranged series in an order of Curie temperatures. These apparatus are appropriate for applications which have a large temperature difference between a high temperature end and a low temperature end.

SUMMARY

In a case of using a plurality of element units arranged in series, it is necessary to prepare a plurality of element units each of which has a predetermined required Curie temperature and can demonstrate a required level of magneto-caloric effect. However, it may be difficult to obtain the element units which fulfill such conditions.

For example, various approaches can be taken in order to give different Curie temperatures to each of a plurality of element units. Various approaches, such as using different material, adjusting a ratio of materials, and adjusting conditions in a manufacturing process, can be used. However, there are difficulties in providing an element unit having a required performance from various viewpoints. For example, several technical obstructions, such as a restriction of the material which can be used, a restriction of the ratio which can be adjusted, and a restriction of parameters which can be adjusted in the manufacturing process, may make it difficult to achieve a required element unit. In another viewpoint, cost may make it difficult to achieve a required element unit.

If a desirable element unit is not available, the plurality of element units arranged in series cannot demonstrate a high performance. For example, if there is a certain difference between the magneto-caloric effects demonstrated by two element units arranged adjacently along a temperature gradient, one of the element units may not be able to perform within a high performance temperature range in which the element unit can demonstrate a high magneto-caloric effect.

In the above viewpoint, or in the other viewpoint not mentioned above, further improvement of a magneto-caloric effect element and a thermo-magnetic cycle apparatus is still required.

It is an object of the present disclosure to provide a magneto-caloric effect element and a thermo-magnetic cycle apparatus in which a series arranged element units can perform at a high effectiveness.

It is another object of the present disclosure to provide a magneto-caloric effect element and a thermo-magnetic cycle apparatus which can perform at a high effectiveness, even if there is a difference in magneto-caloric-effect in a part of the element units.

The present disclosure employs the following technical means, in order to attain the above-mentioned object.

According to the disclosure, a magneto-caloric element is provided. The magneto-caloric element comprises a plurality of element units having different Curie temperatures and being arranged along a direction of temperature distribution. The plurality of element units are capable of demonstrating magneto-caloric effects which is shown by a plurality of performance distributions respectively. At least one of the performance distributions differs in height from the other performance distributions. A size of the element unit and/or Curie temperature of the element unit is set so that a boundary temperature which appears in the rated operational status between two adjoining element units coincides with a cross temperature at which the performance distributions of two adjoining element units crosses each other.

According to this structure, the size of the element unit and/or Curie temperature of the element unit is set so that the boundary temperature and the cross temperature may coincide with each other. By adjusting the boundary temperature and the cross temperature to coincide with each other, regions higher than crossing point of a plurality of performance distributions are used in the rated operational status. Accordingly, even if the heights of the performance distributions of a plurality of element units differ at least in a part thereof, in the rated operational status, a plurality of element units still works at high effectiveness.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are explained referring to drawings. In the embodiments, the same parts and components as those in each embodiment are indicated with the same reference numbers and the same descriptions will not be reiterated. Components and parts corresponding to the components and parts described in the preceding description may be indicated by the same reference number and may not be described redundantly. In a case that only a part of component or part is described, other descriptions for the other embodiment may be referenced or incorporated as descriptions for the remaining part of component or part.

First Embodiment

Figure 1:
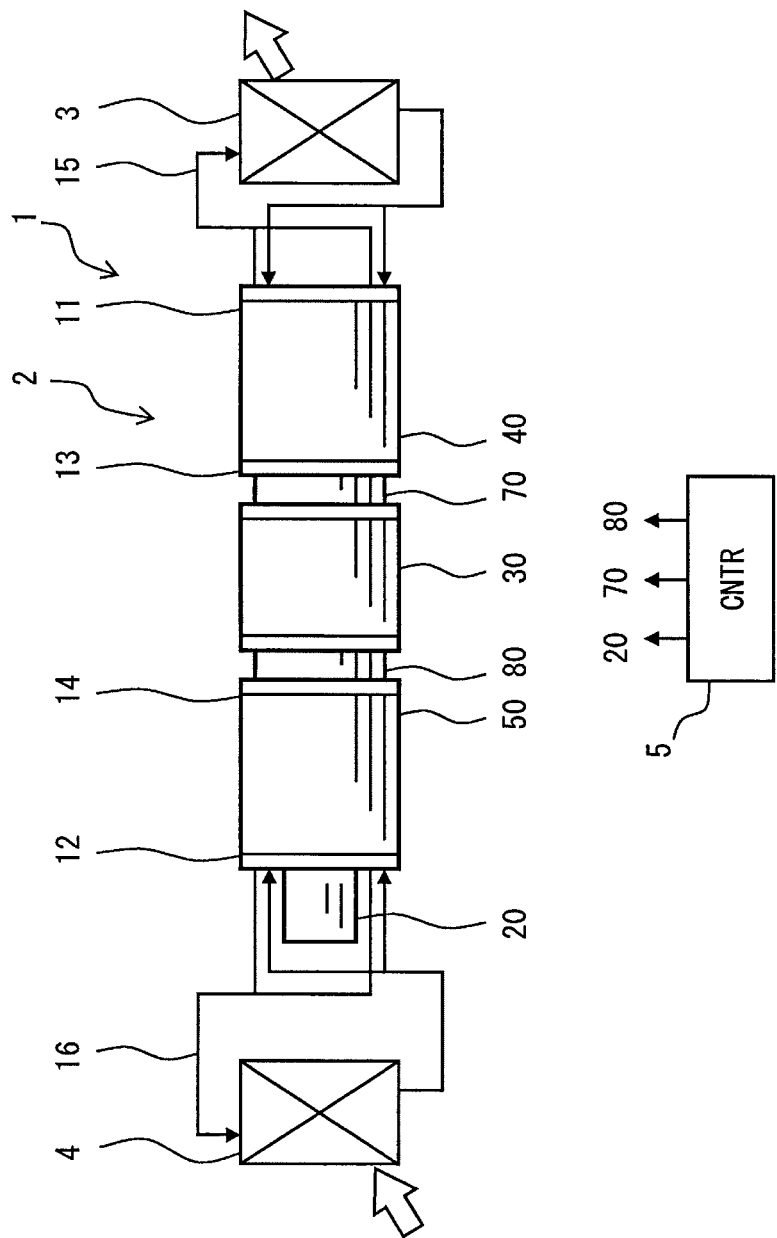
FIG. 1 is a block diagram showing a vehicle air-conditioner 1 having a magneto-caloric effect type heat pump apparatus (MHP) according to a first embodiment of the present disclosure.

FIG. 1 is a block diagram showing a vehicle air-conditioner 1 having a magneto-caloric effect type heat pump apparatus according to a first embodiment of the present disclosure. The magneto-caloric effect type heat pump apparatus 2 may be referred as an MHP 2. The vehicle air-conditioner 1 is mounted on a vehicle, and adjusts a temperature of passenger's cabin. The vehicle air-conditioner 1 has two heat exchangers 3 and 4. The heat exchanger 3 is a high-temperature side heat exchanger which becomes higher in temperature than that of the heat exchanger 4. The heat exchanger 4 is a low-temperature side heat exchanger which becomes lower in temperature than that of the heat exchanger 3. The vehicle air-conditioner 1 also has air handling system components for using the high-temperature side heat exchanger 3 and/or the low-temperature side heat exchanger 4 for air-conditioning purposes, such as an air conditioning duct and a blower.

The vehicle air-conditioner 1 is used as a cooling device or a heating device. The vehicle air-conditioner 1 may have a cooling heat exchanger for cooling air to be supplied to the compartment, and a heating heat exchanger for heating air to be supplied to the compartment. The MHP 2 is used as a cold energy supply source or a hot energy supply source in the vehicle air-conditioner 1. That is, the high-temperature side heat exchanger 3 may be used as the heating heat exchanger. The low-temperature side heat exchanger 4 may be used as the cooling heat exchanger. For example, when the MHP 2 is used as a heating apparatus, the heat exchanger 3 provides an indoor heat exchanger. When the MHP 2 is used as a refrigeration system, the heat exchanger 4 provides an indoor heat exchanger.

The vehicle air-conditioner 1 has the MHP 2 which uses a magneto-caloric effect of a magneto-caloric effect element. The magneto-caloric effect element may be referred to as MCE. The MHP 2 provides a thermo-magnetic cycle apparatus. In this specification, the word of the heat pump apparatus is used in a broad sense. That is, the word of the heat pump apparatus includes both of a heat pump apparatus using cold energy and a heat pump apparatus using hot energy. The heat pump apparatus using cold energy may correspond to a refrigerating cycle apparatus. The word of the heat pump apparatus may be used as a concept that includes the refrigerating cycle apparatus.

The MHP 2 has a motor 20 as a power source, a pump 30 generating flow of a heat transport medium, a first magneto-caloric device unit 40 which accommodates the magneto-caloric element, a second magneto-caloric device unit 50 which accommodates the magneto-caloric element, and transmissions 70 and 80. The MCE generates heat in response to applying the external magnetic field, and absorbs heat in response to removing the external magnetic field. The magneto-caloric device units 40 and 50 may be referred to as an MCD unit (Magneto-Caloric effect Device unit) 40 and 50.

The MHP 2 supplies warm energy to the high-temperature end 11 and supplies cold energy to the low-temperature end 12. As the MHP 2 is activated and operated, the MCE 12 disposed in the MHP 2 gets high temperature at the high temperature end 11 and gets low temperature at the low temperature end 12. The cold energy and the warm energy provided by the MHP 2 are conveyed by the flow of the heat transport medium generated by the pump 30. The heat transport medium is water. Hereafter, the heat transport medium for the MHP 2 is called working water or just water. Hot water flows out from the high temperature end 11 so that warm energy is supplied outside. Water returns to the high-temperature end 11, after supplying warm energy outside. In other words, cold energy is carried into the high-temperature end 11 at this time. Cold water flows out from the low-temperature end 12 so that cold energy is supplied outside. Water returns to the low-temperature end 12, after supplying cold energy outside. In other words, warm energy is carried into the low-temperature end 12 at this time.

The MHP 2 has a plurality of MCD units 40 and 50. The MCD unit 40 disposed on the high-temperature side supplies cold energy to a middle low-temperature end 13. The MCD unit 50 disposed on the low-temperature side supplies warm energy to a middle high-temperature end 14. The middle low-temperature end 13 and the middle high-temperature end 14 are thermally coupled therebetween through the intervening components, including the transmissions 70 and 80, the pump 30, and the heat transport medium. A thermal coupling, which is sufficient to form and maintain a predetermined temperature gradient between the high-temperature end 11 and the low-temperature end 12, is provided between the middle low-temperature end 13 and the middle high-temperature end 14.

The vehicle air-conditioner 1 has a high-temperature circuit 15 which passes through the MHP 2 and the heat exchanger 3. Water flowing through the high-temperature circuit 15 conveys thermal energy to the heat exchanger 3 from the MHP 2. The vehicle air-conditioner 1 has a low-temperature circuit 16 which passes through the MHP 2 and the heat exchanger 4. Water flowing through the low-temperature circuit 16 conveys thermal energy to the MHP 2 from the heat exchanger 4. The vehicle air-conditioner 1 uses external air, outdoor air as a main heat source. The vehicle air-conditioner 1 uses indoor air as a heat load. Therefore, the vehicle air-conditioner 1 provides a heating apparatus. The MHP 2 supplies the thermal energy of the heat exchanger 4, which works as a main heat source, to the heat exchanger 3, which works as a heat load.

The vehicle air-conditioner 1 has a controller (CNTR) 5. The controller 5 controls a plurality of controllable components of the vehicle air-conditioner 1. For example, the controller 5 controls the motor 20 to at least switch the MHP apparatus 2 in an activated mode and a deactivated mode. The controller 5 can control the transmissions 70 and 80 to vary conversion condition between an input and output rotating speeds and/or a revolution phase difference between an input and output of the transmissions 70 and 80.

The controller 5 is an electronic control unit. The controller 5 has at least one processing unit (CPU) and at least one memory (MMR) as a storage medium which stores and memorizes a program and data. The controller 5 is provided my a microcomputer which has a storage medium which can be read by computer. The storage medium is a non-transitory storage medium which stores a program readable by the computer. The storage medium may be provided with semiconductor memory or a magnetic disc. The controller 5 may be provided with a computer or a set of computer resources linked by a data communication device. The program, when the controller 5 executes the program, makes the controller 5 to function as the apparatus described in this specification, and makes the controller 5 to function to perform methods, such as control method, described in this specification. The controller 5 provides various components. At least a part of the components may be referred to as means for performing function, and from the other viewpoint, at least a part of the components may be referred to as compositional block or module.

Figure 2:
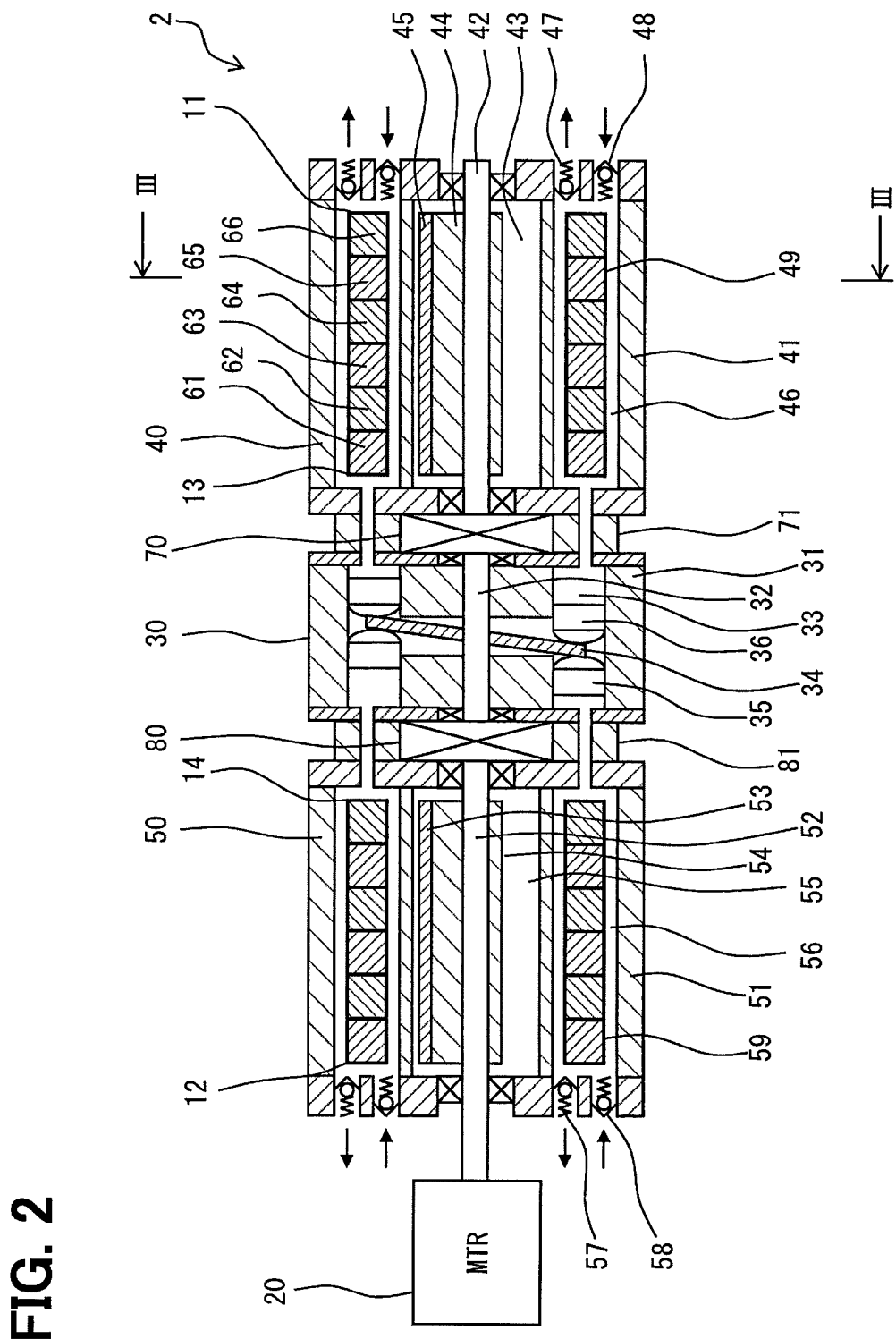
FIG. 2 is a cross-sectional view of the MHP according to the first embodiment.
Figure 3:
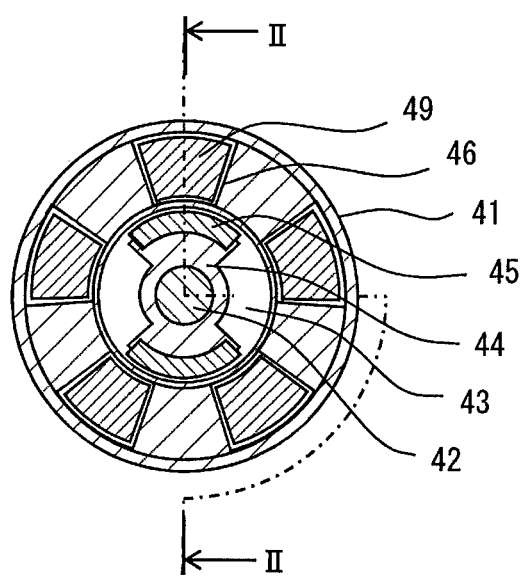
FIG. 3 is a cross-sectional view of the MHP according to the first embodiment.

FIG. 2 is a cross-sectional view of the MHP 2 according to the first embodiment. FIG. 3 is a cross-sectional view of the MHP 2 according to the first embodiment. FIG. 2 shows a cross-section on a II-II line shown in FIG. 3. FIG. 3 shows a cross-section on a line shown in FIG. 2.

The motor 15, which is disposed as a power source of the MHP 2, is driven by a battery mounted on the vehicle. The motor 20 drives the pump 30. Thereby, the motor 20 and the pump 30 supply a bidirectional flow of water. The motor 20 rotates permanent magnets in the MCD units 40 and 50. Thereby, the motor 20 and the MCD units 40 and 50 create a periodic alternating change between a condition in which an external magnetic field is applied to the MCE 12 and a condition in which the external magnetic field is removed from the MCE 12. The condition in which the external magnetic field is removed may corresponds to a condition in which the external magnetic field is not applied to the MCE 12 or just reduced from the applied condition.

The pump 30 generates a bidirectional flow of water in the MCD units 40 and 50 for operating the MCE as an AMR (Active Magnetic Refrigeration) cycle. The pump 30, water and passages provide a medium system. The medium system generates flow of the heat transport medium which carries out heat exchange to the magneto-caloric element, and conveys a thermal energy. The bidirectional flow is a flow of water which goes back and forth between the high-temperature end and low-temperature end in the MCD units 40 and 50. The pump 30 also generates a recirculation flow of water for supplying the cold energy and/or warm energy obtained by the MCD units 40 and 50 to the outside. The recirculation flow is a flow of water which comes out of the MCD units 40 and 50, and then returns to the MCD units 40 and 50. The recirculation flow may include a high-temperature side external recirculation flow which comes out of the high-temperature end 11, passes through the high-temperature circuit 15, and returns to the high-temperature end 11. The recirculation flow may include a low-temperature side external recirculation flow which comes out of the low-temperature end 12, passes through the low-temperature circuit 16, and returns to the low-temperature end 12. In this embodiment, the pump 30 produces both the high-temperature side external recirculation flow and the low-temperature side external recirculation flow.

The pump 30 is a displacement-type bidirectional flow pump. The pump 30 is a piston pump so called the swash plate type. The pump 30 has a housing 31 which can be called as a cylindrical shape or a columnar shape. The housing 31 supports a rotary shaft 22 rotatably on a central axis of the housing 31. The housing 31 defines at least one cylinder 33. The housing 31 defines a plurality of cylinders 33 arranged at equal intervals on a radial outside of the rotary shaft 32. In this embodiment, the housing 31 defines five cylinders 33. The housing 31 accommodates a swash plate 34. The swash plate 34 is supported rotatably in an inclined state at a predetermined angle with respect to the central axis of the housing 31. The swash plate 34 is connected with the rotary shaft 32 so that it may rotate with the rotary shaft 32. Two pistons 35 and 36 are arranged in one cylinder 33. The swash plate 34 is located between two pistons 35 and 36.

One piston 35 can reciprocally move within the right half part of the cylinder 33 in the drawing. The other piston 36 can reciprocally move within the left half part of the cylinder 33 in the drawing. As a result, a 2-cylinder displacement type piston pump is formed within one cylinder 33. Volumes of these 2 cylinders vary complementarily. These 2 cylinders simultaneously generate a flow which is directed from the low-temperature end 12 toward the middle high-temperature end 14 and a flow which directed from the middle low-temperature end 13 toward the high-temperature end 11. These 2 cylinders simultaneously generate a flow which is directed from the high-temperature end 11 toward the middle low-temperature end 13 and a flow which is directed from the middle high-temperature end 14 toward the low-temperature end 12.

Since the housing 31 has five cylinders 33, the pump 30 provides a 10-cylinder piston pump. In another viewpoint, it can be said that the pump 30 provides a first pump group located on the right side and a second pump group located on the left side by having the pistons 35 and 36 on both sides of the swash plate 34. The first pump group is a pump for a first MCD unit 40. The second pump group is a pump for a second MCD unit 50.

The MCD unit 40 and the MCD unit 50 are separately arranged on both sides of the pump 30. The MCD unit 40 and the MCD unit 50 are symmetrically configured on both sides of the pump 30 and arranged to provide a symmetric arrangement. It can be said that the MCD unit 40 and the MCD unit 50, as a whole, constitute one MCD unit which supplies warm energy to the high-temperature end 11 and supplies cold energy to the low-temperature end 12.

The MCD units 40 and 50 have housings 41 and 51 which can be called as a cylindrical shape or a columnar shape. The housings 41 and 51 support rotary shafts 42 and 52 rotatably on a central axis thereof. The housings 41 and 51 define magnet accommodation chambers 43 and 53, which are columnar chambers, around the rotary shafts 42 and 52, respectively. Rotor cores 44 and 54 are fixed on the rotary shafts 42 and 52, respectively. The rotor cores 44 and 54 are configured to form two ranges along circumferential direction. One range is easy to pass through the magnetic flux. The other range is hard to pass through the magnetic flux. Rotor cores 44 and 54 have at least one fan-shaped part in the cross section. In this embodiment, the rotor cores 44 and 54 have two fan-shaped parts. Permanent magnets 45 and 55 are fixed to the rotor cores 44 and 54, respectively. The permanent magnets 45 and 55 are formed in a semi-cylindrical shape which has a fan-shaped cross section. The permanent magnets 45 and 55 are fixed on a radial outside surface of the rotor cores 44 and 54, respectively.

The rotor cores 44 and 54 and the permanent magnets 45 and 55 form regions around them. One region is that the external magnetic field provided by the permanent magnets 45 and 55 is strong. The other one region is that the external magnetic field provided by the permanent magnets 45 and 55 is weak. In the region in which the external magnetic field is weak, a state in which the external magnetic field is almost completely removed is provided. The rotor cores 44 and 54 and the permanent magnets 45 and 55 rotate in a synchronizing manner with a revolution of the rotary shafts 42 and 52. Therefore, the region of strong external magnetic field and the region of weak external magnetic field rotate in a synchronizing manner with the revolution of the rotary shafts 42 and 52. As a result, at one point on a circumference of the rotor cores 44 and 54 and the permanent magnets 45 and 55, a period when the external magnetic field is strongly applied and a period when the external magnetic field becomes weak and was almost removed are alternately appears. Therefore, the rotor cores 44 and 54 and the permanent magnets 45 and 55 provide a magnetic-field applying and removing device which alternates applying and removing of the external magnetic field.

The rotor cores 44 and 54 and the permanent magnets 45 and 55 provide a magnetic field modulating device which alternately switches the state applying the external magnetic field to the MCE 49 and 59 and the state removing the external magnetic field from the MCE 49 and 59. The magnetic field modulating device has a first permanent magnet 45 and a second permanent magnet 55. The first permanent magnet 45 is disposed in the first MCD unit 40, and switches applying and removing of the magnetic field to the first MCE 49 by being rotated. The second permanent magnet 55 is disposed in the first MCD unit 50, and switches applying and removing of the magnetic field to the second MCE 59 by being rotated. The word of the magnetic field is interchangeable with magnetic flux density or magnetic field strength. The rotor cores 44 and 54 and the permanent magnets 45 and 55 are also a magnetic field supplying device which supply the external magnetic field to the MCE 49 and 59. The rotor cores 44 and 54 and the permanent magnets 45 and 55 are also a magnetic device which places the MCE under an influence of the external magnetic field for operating the MCE as the AMR (Active Magnetic Refrigeration) cycle.

The housings 41 and 51 define at least one work chamber 46 and 56. The work chambers 46 and 56 are located next to magnet accommodation chambers 43 and 53, respectively. The housings 41 and 51 define a plurality of work chambers 46 and 56 arranged at equal intervals on a radial outside of the magnet accommodation chambers 43 and 53, respectively. In this embodiment, one housing 41 defines five work chambers 46. One housing 51 defines five work chambers 56. Each of the work chambers 46 and 56 forms a columnar-shaped chamber which has a longitudinal direction along the axial direction of the housings 41 and 51. One work chamber 46 or 56 is formed so that it corresponds to only one cylinder 33. Two work chambers 46 and 56 are arranged on both sides of one cylinder 33.

One work chamber 46 has a first opening portion through which water enters and exits on an end thereof. The first opening portion has an outlet which supplies water to the indoor heat exchanger 3, and an inlet which receives water returning from the indoor heat exchanger 3. A one-way valve 47 which permits only outflow of water from the work chamber 46 is formed in the outlet. A one-way valve 48 which permits only inflow of water to the work chamber 46 is formed in the inlet. These one-way valves 47 and 48 may be provided by lead valves or ball valves. One work chamber 46 has a second opening portion which communicates the work chamber 46 to the pump 30 on the other end. The second opening portion communicates only with one pump chamber formed of one cylinder 33 and one piston 35.

One work chamber 56 has a first opening portion through which water enters and exits on an end thereof. The first opening portion has an outlet which supplies water to the outdoor heat exchanger 4, and an inlet which receives water returning from the outdoor heat exchanger 4. A one-way valve 57 which permits only outflow of water from the work chamber 56 is formed in the outlet. A one-way valve 58 which permits only inflow of water to the work chamber 56 is formed in the inlet. These one-way valves 57 and 58 may be provided by lead valves or ball valves. One work chamber 56 has a second opening portion which communicates the work chamber 56 to the pump 30 on the other end. The second opening portion communicates only with one pump chamber formed of one cylinder 33 and one piston 36.

The work chambers 46 and 56 provide channels through which water flow as the heat transportation medium. Water flow along longitudinal directions of the work chambers 46 and 56. Water reciprocally flow along the longitudinal directions of the work chambers 46 and 56. The work chambers 46 and 56 also provide accommodation chambers in which the MCE 49 and 59 are accommodated. The housings 41 and 51 provide containers in which the work chambers 46 and 56 are formed, respectively. The MCE 49 and 59 which are magnetic working materials having magneto-caloric effect are disposed in the work chambers 46 and 56.

When the external magnetic field is applied to the MCE 49 and 59, electron spins gather in the direction of the magnetic field. At this time, magnetic entropy decreases and the temperature is raised by emitting heat. When the external magnetic field is removed from the MCE 49 and 59, the electron spins become to have disordered state. At this time, magnetic entropy increases and the temperature is lowered by absorbing heat. The MCE 49 and 59 are made of magnetic substance which has a high magneto-caloric effect in an ordinary temperature region. For example, the MCE 49 and 59 may be made of a gadolinium (Gd)-base material or lanthanum-iron-silicon compound. Alternatively, a mixture of manganese, iron, phosphorus, and germanium may be used for the MCE 49 and 59.

The MCE 49 and 59 are formed in rod shapes each of which has a longitudinal direction along the axial direction of the MCD units 40 and 50. The MCE 49 and 59 have the longitudinal direction along a direction of temperature distribution between the high-temperature end and the low-temperature end. The MCE 49 and 59 are formed in shapes which can provide sufficient heat exchange with water flowing through within the work chambers 46 and 56. Each one of the MCE 49 and 59 may also be referred to as an element bed. In this embodiment, the MCE disposed between the high-temperature end 11 and the low-temperature end 12 has a first MCE 49 and a second MCE 59. The first MCE 49 is disposed in the first MCD unit 40. The first MCE 49 has the middle low-temperature end 13 at one end and has the high-temperature end 11 in the opposite other end. The second MCE 59 is disposed in the second MCD unit 50. The second MCE 59 has the low-temperature end 12 at one end and has the middle high-temperature end 14 in the opposite other end.

Each one of the MCE 49 and 59 has a plurality of element units 61-66. The element units 61-66 are arranged by stacking or laminating along a longitudinal direction of the MCE 49 and 59, i.e., a flow direction of water. Referring to FIG. 2, six element units 61-66 belonging to one MCE 49 located in the upper right are shown by the reference numbers.

The MCE 49 and 59 are placed under influence of the external magnetic field which is switched between an applied state and a removed state by the rotor cores 44 and 54 and the permanent magnets 45 and 55. That is, as the rotary shafts 42 and 52 rotate, it is performed to switch the applied state in which the external magnetic field for magnetizing the MCE 49 and 59 is applied and the removed state in which the external magnetic field is removed from the MCE 49 and 59.

One of the MCD units 40 and 50 has a plurality of MCE 49 and 59 which are thermally connected in parallel. For example, in the MCD unit 40, five MCE 49 are connected in thermally parallel. In the MCD unit 50, five MCE 59 are thermally connected in parallel. It can be said that a plurality of MCE 49 and 59 belonging to a plurality of MCD units 40 and 50 constitute one MCE thermally connected in series.

The transmission 70 is formed between the rotary shaft 32 of the pump 30, and the rotary shaft 42 of the MCD unit 40. The transmission 70 adjusts the rotating speed and/or revolution phase angle between the rotary shaft 32 and the rotary shaft 42. The transmission 80 is formed between the rotary shaft 32 of the pump 30, and the rotary shaft 52 of the MCD unit 50. The transmission 80 adjusts the rotating speed and/or revolution phase angle between the rotary shaft 32 and the rotary shaft 52. In this embodiment, the motor 20 is connected to the rotary shaft 52. The transmissions 70 and 80 adjust rotational relationships among the rotary shaft 32, the rotary shaft 42, and the rotary shaft 52 so that the pump 30 and the MCD units 40 and 50 are operated to provide the AMR cycle.

A passage forming member 71 forming a passage for water is formed between the pump 30 and MCD unit 40. The passage forming member 71 forms a channel which communicates one cylinder 33 and one work chamber 46. A passage forming member 81 forming a passage for water is formed between the pump 30 and the MCD unit 50. The passage forming member 81 forms a channel which communicates one cylinder 33 and one work chamber 56.

In this embodiment, a plurality of MHP units is formed by a multi-cylinder piston pump formed on the right half part of the pump 30 and the MCD unit 40. Five MHP units are formed. These MHP units are thermally connected in parallel. In this embodiment, a plurality of MHP units is formed by a multi-cylinder piston pump formed on the left half part of the pump 30 and the MCD unit 50. Five MHP units are formed. These MHP units are thermally connected in parallel. Furthermore, a plurality of MHP units are arranged on both sides of the pump 30 are thermally connected in series.

FIG. 4-FIG. 9 are combined graphs showing characteristics of the MCE which can be used as the MCE 49 and 59 shown in FIG. 1-FIG. 3. In each of the drawings, a plurality of graphs showing the characteristics of the MCE and an arrangement of the MCE are shown in an associated manner.

In the drawings, a diagram (a) shows a mechanical configuration of the MCE. A diagram (b) is a graph showing distribution of Curie temperatures Tc of a plurality of element units belonging to the MCE. A diagram (c) is a graph showing an example of distributions of actual temperatures Ta when the MCE is operated by the rated operational status. A diagram (d) is a graph showing an amount of magneto-caloric-effect Delta-S (J/kgK) demonstrated by a plurality of element units belonging to the MCE. The magneto-caloric-effect Delta-S corresponds to an amount of performance which an element unit can demonstrate. Here, the performance per unit is shown.

In a graph (d), one curved shape shown by a thin solid line indicates a distribution of the magneto-caloric-effect Delta-S, which a corresponding element unit can demonstrate, along a temperature axis. Distribution of the magneto-caloric-effect Delta-S is also called a performance distribution. Here, in order to understand easily, a distribution of the magneto-caloric effect which one element unit demonstrates is illustrated in a parabolic shape. A thick solid line indicates a distribution of the magneto-caloric-effect Delta-S which corresponding one of the element units 61-66 actually demonstrates under the temperature distribution acquired in the rated operational status. A range shown by one curved shape indicated by a thick solid line corresponds to a distribution of the magneto-caloric effect which one element unit demonstrates. Therefore, a waveform of one curved shape indicated by the thick solid line shows a performance which each one of the element units 61-66 actually demonstrates. a waveform of one curved shape indicated by the thick solid line is also called the actual performance in the rated operational status. For example, in the rated operational status, the element unit 61 demonstrates the actual performance shown by the thick solid line in a temperature zone at the very end side. At this time, the element unit 61 is placed on a temperature zone between a temperature TL on the low-temperature end and a temperature Tb12 on a boundary between the element unit 61 and the element unit 62, and is functioning as an element of the AMR cycle. This temperature zone may also be called a rated temperature zone.

(MCE for First Comparative Example)

Figure 4:
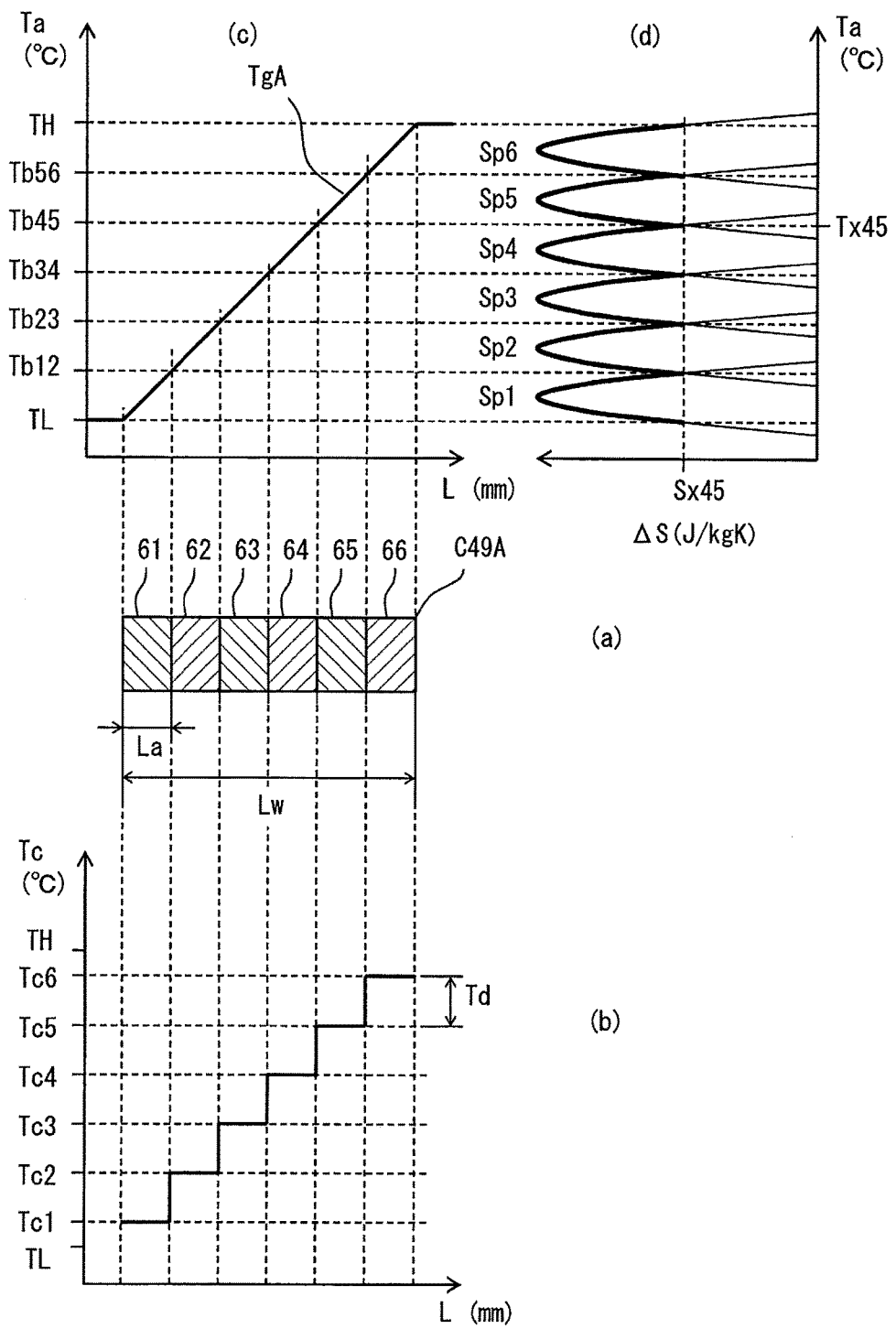
FIG. 4 is a combined graph showing characteristic of a magneto-caloric effect element (MCE) according to a first comparative example.

FIG. 4 shows an MCE C49A which can be used as the MCE 49 and 59. As shown in a diagram (a), the MCE C49A has element units 61-66. The MCE C49A has an overall length Lw along the direction of temperature distribution. Each of the element units 61-66 has a length La along the direction of temperature distribution. Each of the element units 61-66 has the same length La. The length La is given by dividing the overall length Lw evenly by the element units 61-66. In the MCE C49A, a plurality of element units 61-66 has the same length La.

As shown in a diagram (b), each one of the element units 61-66 has different Curie temperatures Tc1-Tc6. A plurality of Curie temperatures Tc1-Tc6 are set so that each of the element units 61-66 can demonstrate a high magneto-caloric effect when each of the element units 61-66 is placed in the temperature zone where each of the element units 61-66 shall be placed in the rated operational status. A plurality of element units 61-66 are arranged in an order of those Curie temperatures Tc1-Tc6. In other words, a plurality of element units 61-66 are arranged so that those Curie temperatures Tc1-Tc6 corresponds to a temperature gradient between the high-temperature end and the low-temperature end.

Adjoining pairs of a plurality of Curie temperatures Tc1-Tc6 are distanced by a temperature difference Td. In the MCE C49A, the temperature differences Td between two adjoining Curie temperatures are altogether equal. Therefore, in the MCE C49A, Curie temperatures Tc1-Tc6 are set with even temperature intervals. Curie temperatures Tc1-Tc6 are set in a symmetric manner and distributed with even temperature intervals between the temperature TL on the low-temperature end and the temperature TH on the high-temperature end.

As the MCE C49A reaches the rated operational status, the MCE C49A creates a temperature gradient TgA shown in a diagram (c). A temperature difference between the temperature TH on the high-temperature end and the temperature TL on the low-temperature end is evenly shared by a plurality of element units 61-66. Each one of the element units 61-66 is assigned a temperature zone which is one of the temperature zones having an equal temperature difference. For example, the temperature zone assigned for the element unit 61 is between the temperature IL on the low-temperature end and a boundary temperature Tb12. The temperature zone assigned for the element units 62 is between the boundary temperature Tb12 and a boundary temperature Tb23. Width of the temperature zones, i.e., the temperature differences are equal.

As shown in a diagram (d), the magneto-caloric effect which the element units 61-66 demonstrate are expressed with performance distributions Sp1-Sp6. The performance distributions Sp1-Sp6 are similar to each other. Peak magnitudes of the performance distributions Sp1-Sp6 are almost equal. Spreading widths along the temperature axis of the performance distributions Sp1-Sp6 are almost equal. Adjoining performance distributions cross each other. For example, a performance distribution Sp4 of the element unit 64 and a performance distribution Sp5 of the element unit 65 cross at a crossing point, i.e., a temperature Tx45, and a performance Sx45. The temperature Tx45 is also called a cross temperature.

In this comparative example, the thick solid line is like a continuous wave shape. In other words, a plurality of actual performances provided by the element units 61-66 is continuous with each other along the temperature axis. Such a plurality of actual performances makes it possible to operate a plurality of element units 61-66 at high effectiveness.

Assume that one arbitrary element unit is a first element unit, and another element unit adjoining the first element unit is a second element unit. In this case, the boundary temperature between the first element unit and the second element unit is substantially equal to, i.e., coincides with, the cross temperature between the performance distributions of these element units. In other words, an end of the rated temperature zone of the first element unit is equal to a crossing point between the performance distribution of the first element unit and the performance distribution of the second element unit. That is, the cross temperature of the performance distributions of two adjoining element units coincides with the boundary temperature between these two element units in the rated operational status. In this disclosure, a coincidence of two temperatures may include a mathematical perfect equal, and may also include a rough equal in a grade in which actual performances are positioned continuously and no significant performance loss is produced. In this example, all of the above-mentioned relationships are satisfied among all the element units.

For example, a boundary temperature Tb45 between the element unit 64 and the element unit 65 coincides with a cross temperature Tx45 between the performance distributions Sp4 and Sp5 of these element units 64 and 65. In other words, the end of the rated temperature zone of the element unit 64 coincides with the cross temperature Tx45 between the performance distribution Sp4 and the performance distribution Sp5. The cross temperature Tx45 between the performance distributions Sp4 and Sp5 coincides with the boundary temperature Tb45 between two element units 64 and 65 in the rated operational status.

In the case of the MCE C49A, a plurality of element units 61-66 which can function with high performance in difference temperature zones, and can demonstrate substantially equal magneto-caloric effect are used. In the MCE C49A, a temperature gradient in the regular operation condition is evenly assigned to a plurality of element units 61-66. That is, a plurality of element units 61-66 have the same length, and have Curie temperatures which defines the same temperature intervals. Thereby, all of the element units 61-66 can demonstrate high levels of magneto-caloric effect in the regular operation condition. Therefore, all the element units 61-66 are used at high effectiveness. As a result, it is possible to realize high operating efficiency with low input electric power.

By the way, it may be difficult to give ideal performance distributions Sp1-Sp6 which is illustrated in a diagram (d) to a plurality of element units 61-66 arranged in series. For example, values of peak magnitude of performance distributions and/or values of spreading width of performance distributions may differ for every element units. Such a variation of the performance distributions may be produced by some technical obstructions, such as a restriction of usable material, a restriction of an adjustable range of a material ratio, and a restriction of an adjustable range of parameters in a manufacturing process. As a result, it is difficult to prepare required element units. In addition, cost may make it difficult to prepare required element units. As a result, there may be a case in which a plurality of element units having different shapes of the performance distributions have to be arranged in series.

(MCE for Second Comparative Example)

Figure 5:
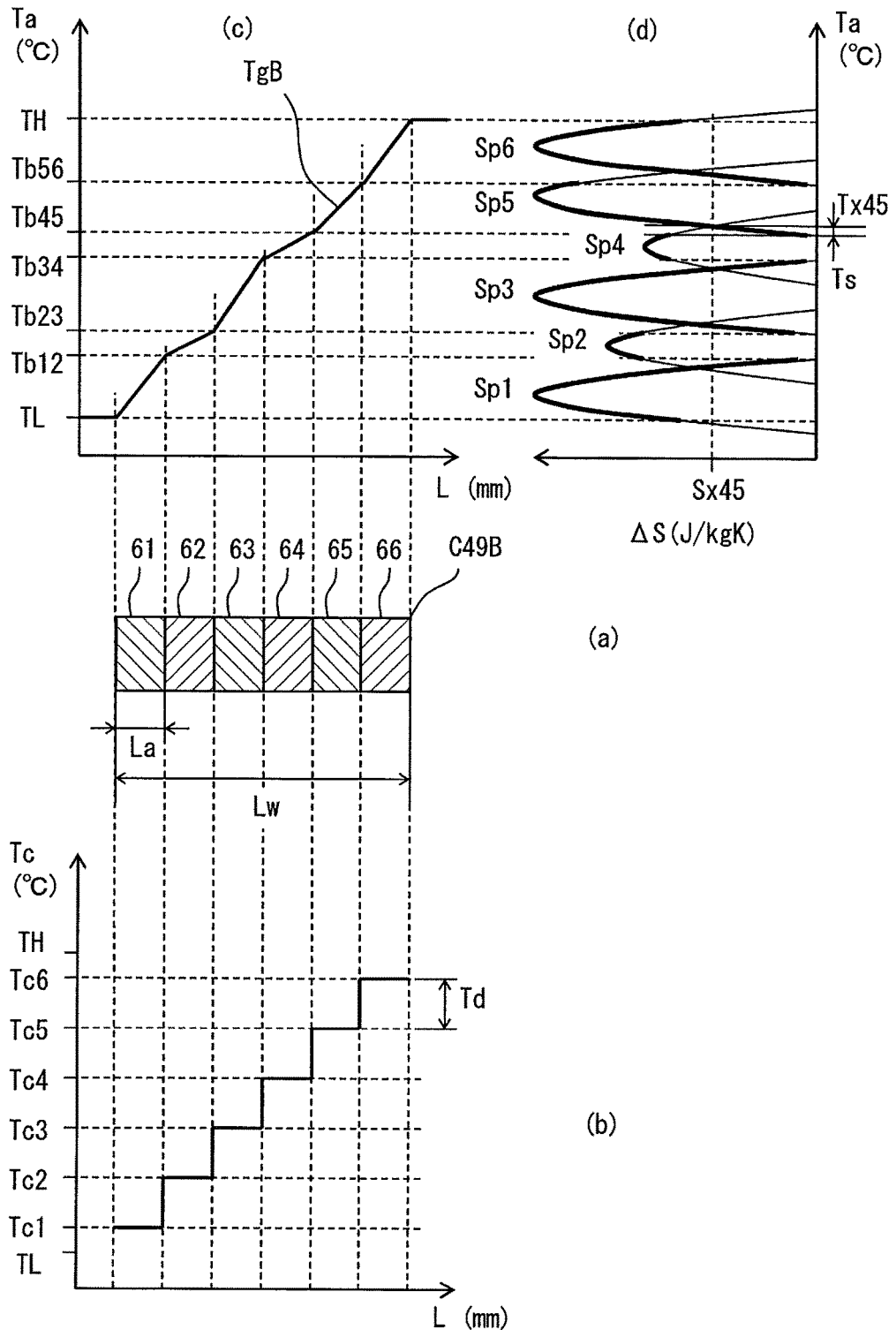
FIG. 5 is a combined graph showing characteristic of an MCE according to a second comparative example.

FIG. 5 shows an MCE C49B which can be used as the MCE 49 and 59. As shown in a diagram (a), the MCE C49B has element units 61-66. The plurality of element units 61-66 have the same length La. As shown in a diagram (b), Curie temperatures Tc1-Tc6 are set at even intervals. As shown in a diagram (d), magneto-caloric effect distributions Sp1-Sp6 which can be demonstrated by the plurality of element units, respectively, are not similar to each other. Especially the magneto-caloric effect which can be demonstrated by the element units 62 and 64 are lower than the magneto-caloric effect which can be demonstrated by the other element units 61, 63, 65, and 66. In other words, the performances of the element units 62 and 64 are lower than the performances of the element units 61, 63, 65, and 66.

In this arrangement, the element units 61, 63, 65, and 66 with high performance demonstrate greater magneto-caloric effect and create larger temperature difference. Here, the words high-performance and low-performance mean levels of magneto-caloric effect which an element per unit volume can demonstrate. On the other hand, the element units 62 and 64 with low performance demonstrate smaller magneto-caloric effect than the element units 61, 63, 65, and 66, and create smaller temperature differences relatively. As a result, the temperature gradient TgB which is illustrated by the diagram (c) is produced. The temperature zones in which the element units 61, 63, 65, and 66 with high performance work are relatively wider. The temperature zones in which the element units 62 and 64 with low performance work are relatively narrower. As a result, due to performance differences among the element units 61-66, the temperature zone where each of the element units 61-66 works are shifted from a desirable temperature zone.

As shown in a diagram (d), the cross temperature of the performance distributions of two adjoining element units does not coincide with the boundary temperature between these two element units in the rated operational status. That is, the cross temperature and the boundary temperature are shifted. For example, a boundary temperature Tb45 between the element unit 64 and the element unit 65 is lower than a cross temperature Tx45 between the performance distributions Sp4 and Sp5 of these element units 64 and 65. A shifted temperature Ts is created between the cross temperature Tx45 and the boundary temperature Tb45.

The element unit 65 is used to a temperature zone lower than the cross temperature Tx45. On the other hand, the element unit 64 is only used at near the peak. As a result, in a shifted temperature zone Ts, although the element unit 64 can demonstrate magneto-caloric effect higher than that of the element unit 65, the element unit 65 is used. Therefore, high effectiveness is not acquired in the shifted temperature zone Ts.

Similar inefficient operational status may also be produced between adjoining element units having performance gap. For example, inefficient operational status occurs between the element unit 61 and the element unit 62, between the element unit 62 and the element unit 63, and between the element unit 63 and the element unit 64. Furthermore, inefficient operational status may also be produced between the element units without a performance gap due to a performance gap between another pair of the element units. For example, inefficient operational status occurs also between the element unit 65 and the element unit 66. This is because a shifting of the temperature distribution on the MCE C49B.

As a result, according to the MCE C49B, it is impossible to obtain high magneto-caloric effect due to performance gaps among a plurality of element units. It is impossible to obtain high magneto-caloric effect by the MHP using the MCE C49B.

(MCE for Third Comparative Example)

Figure 6:
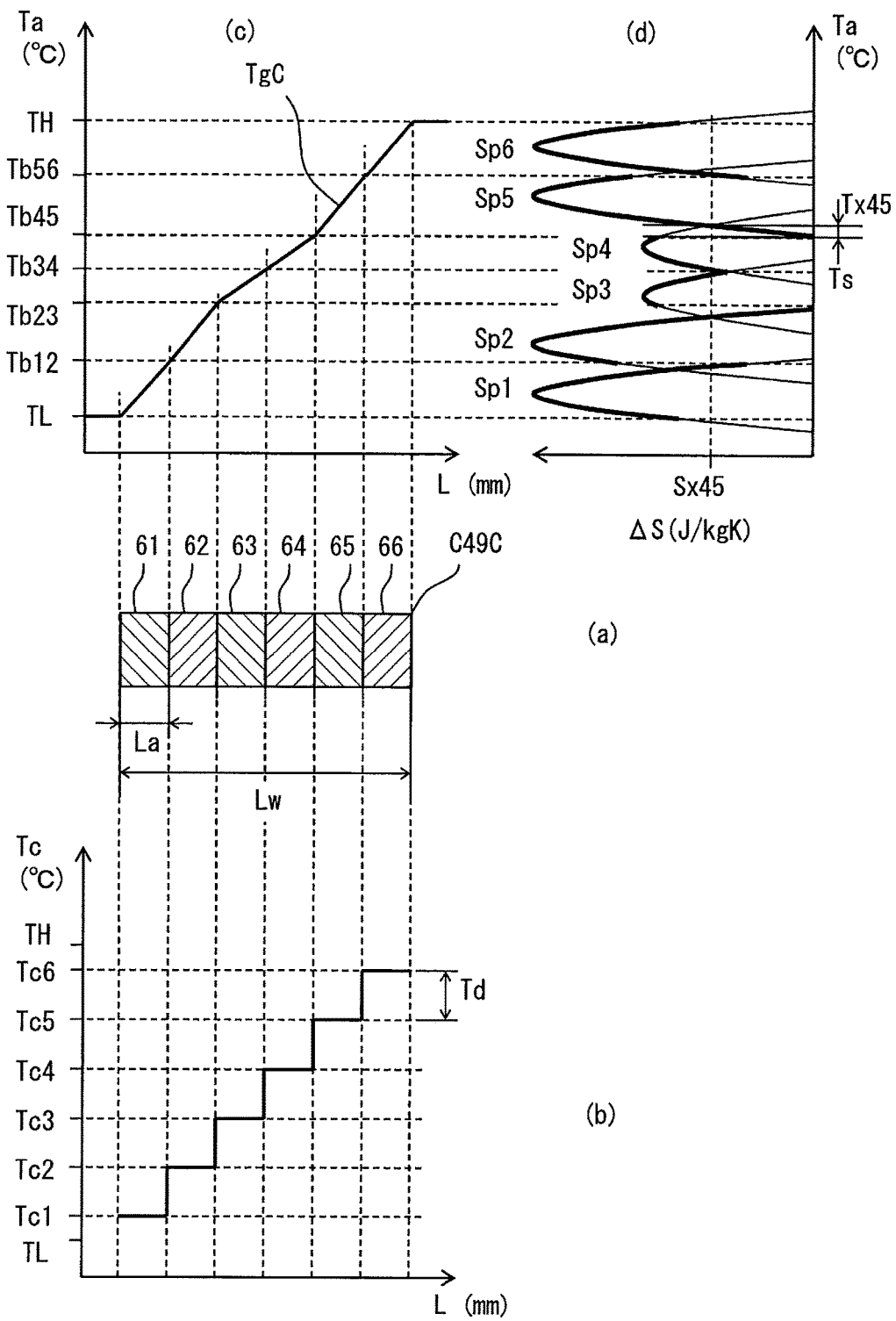
FIG. 6 is a combined graph showing characteristic of an MCE according to a third comparative example.

FIG. 6 shows an MCE C49C which can be used as the MCE 49 and 59. As shown in a diagram (a), the MCE C49C has element units 61-66. The plurality of element units 61-66 have the same length La. As shown in a diagram (b), Curie temperatures Tc1-Tc6 are set at even intervals. As shown in a diagram (d), magneto-caloric effect distributions Sp1-Sp6 which can be demonstrated by the plurality of element units, respectively, are not similar to each other. Especially the magneto-caloric effect which can be demonstrated by the element units 63 and 64 are lower than the magneto-caloric effect which can be demonstrated by the other element units 61, 62, 65, and 66. In other words, the performances of the element units 63 and 64 are lower than the performances of the element units 61, 62, 65, and 66.

In this arrangement, the element units 61, 62, 65, and 66 with high performance demonstrate greater magneto-caloric effect and create larger temperature difference. On the other hand, the element units 63 and 64 with low performance demonstrate smaller magneto-caloric effect than the element units 61, 62, 65, and 66, and create smaller temperature differences relatively. As a result, the temperature gradient TgC which is illustrated by the diagram (c) is produced. The temperature zones in which the element units 61, 62, 65, and 66 with high performance work are relatively wider. The temperature zones in which the element units 63 and 64 with low performance work are relatively narrower. As a result, due to performance differences among the element units 61-66, the temperature zone where each of the element units 61-66 works are shifted from a desirable temperature zone.

As shown in a diagram (d), the cross temperature of the performance distributions of two adjoining element units does not coincide with the boundary temperature between these two element units in the rated operational status. That is, the cross temperature and the boundary temperature are shifted. For example, a boundary temperature Tb45 between the element unit 64 and the element unit 65 is lower than a cross temperature Tx45 between the performance distributions Sp4 and Sp5 of these element units 64 and 65. A shifted temperature Ts is created between the cross temperature Tx45 and the boundary temperature Tb45.

The element unit 65 is used to a temperature zone lower than the cross temperature Tx45. On the other hand, the element unit 64 is used at near the peak and a temperature range shifted to one side from the peak. As a result, in a shifted temperature zone Ts, although the element unit 64 can demonstrate magneto-caloric effect higher than that of the element unit 65, the element unit 65 is used. Therefore, high effectiveness is not acquired in the shifted temperature zone Ts.

Similar inefficient operational status may also be produced between adjoining element units having performance gap. For example, inefficient operational status occurs between the element unit 62 and the element unit 63, and between the element unit 63 and the element unit 64. Furthermore, inefficient operational status may also be produced between the element units without a performance gap due to a performance gap between another pair of the element units. For example, inefficient operational status occurs between the element unit 61 and the element unit 62, and between the element unit 65 and the element unit 66. This is because a shifting of the temperature distribution on the MCE C49C.

As a result, according to the MCE C49C, it is impossible to obtain high magneto-caloric effect due to performance gaps among a plurality of element units. It is impossible to obtain high magneto-caloric effect by the MHP using the MCE C49C.

(MCE for First Embodiment)

Figure 7:
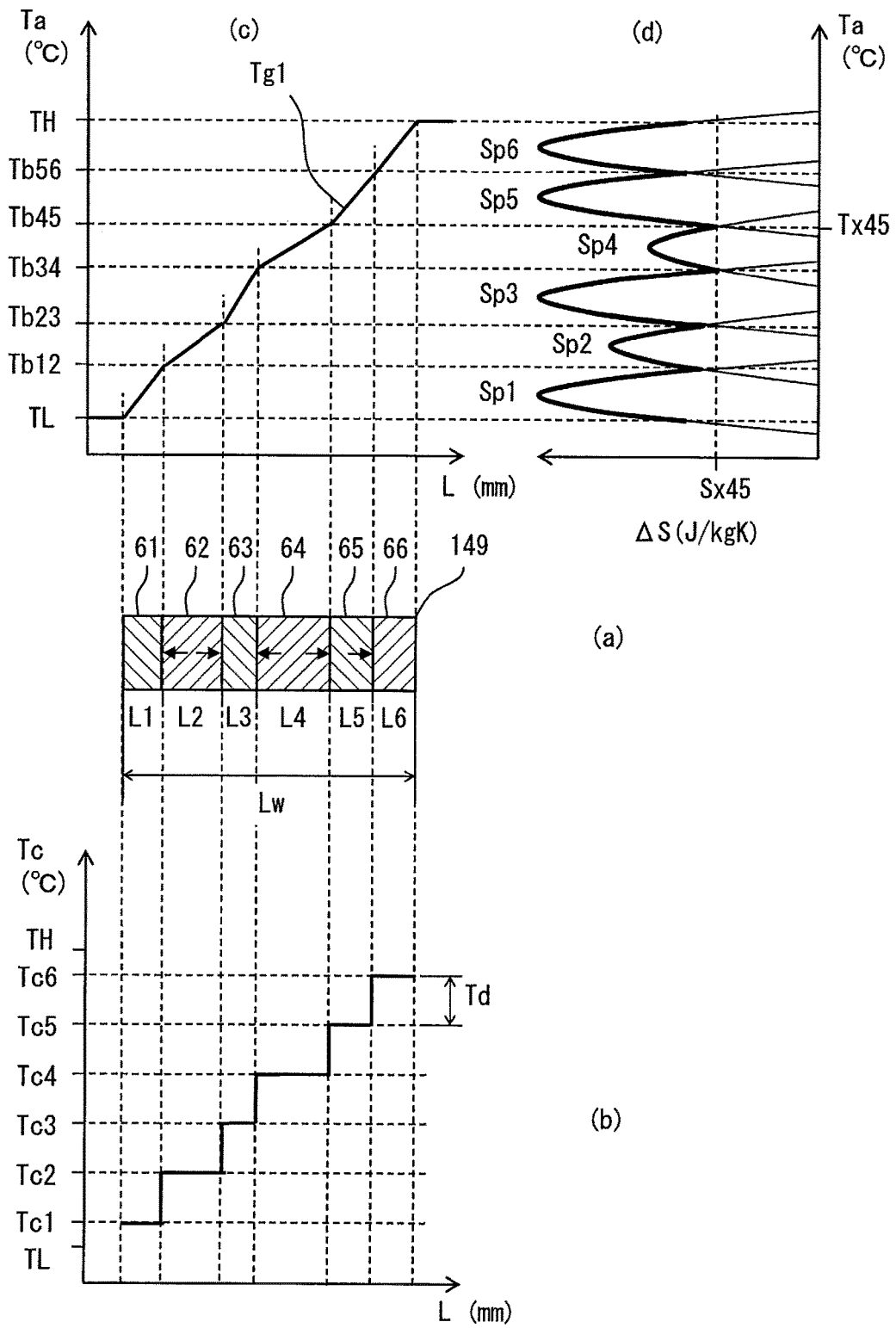
FIG. 7 is a combined graph showing characteristic of an MCE according to the first embodiment.

FIG. 7 shows the MCE 149 which can be used as the MCE 49 and 59. As shown in a diagram (a), the MCE 149 has the element units 61-66. At least one element unit has different lengths from the other element units. In the illustrated example, a plurality of element units 61-66 have different lengths L1-L6, respectively. As shown in a diagram (b), Curie temperatures Tc1-Tc6 are set at even intervals in the MCE 149. As shown in a diagram (d), magneto-caloric effect distributions Sp1-Sp6 which can be demonstrated by the plurality of element units, respectively, are not similar to each other. Especially the magneto-caloric effect which can be demonstrated by the element units 62 and 64 are lower than the magneto-caloric effect which can be demonstrated by the other element units 61, 63, 65, and 66. In other words, the performances of the element units 62 and 64 are lower than the performances of the element units 61, 63, 65, and 66.

In this arrangement, the element units 61, 63, 65, and 66 with high performance have lengths L1, L3, L5, and L6 which are set shorter than the length La. On the other hand, the element units 62 and 64 with low performance have lengths L2 and L4 which are set longer than the length La. In another viewpoint, the lengths L1, L3, L5, and L6 are set shorter than the lengths L2 and L4. Specifically, the lengths L1-L6 are set in a following relationship: L3<L5<L1<L6<L2<L4. In other words, the lengths L1-L6 are set so that the lengths L2 and L4 of a relatively low performance element units are longer than the lengths L1, L3, L5, and L6 of a relatively high performance element units.

In this example, the element units 61, 63, 65, and 66 with high performance have relatively short length. Accordingly, the magneto-caloric effect which the element units 61, 63, 65, and 66 generate is reduced, and the temperature difference generated there is also reduced. On the other hand, the element units 62 and 64 with low performance have relatively long length. Accordingly, the magneto-caloric effect which the element units 62 and 64 generate is increased, and the temperature difference generated there is also increased. As a result, the temperature gradient Tg1 which is illustrated by the diagram (c) is produced. Although performance differences among the element units 61-66, the temperature zones where each of the element units 61-66 works are adjusted and maintained at desirable temperature zones by the temperature gradient Tg1.

In this embodiment, the lengths L1-L6 are set so that the cross temperatures of the performance distributions of two adjoining element units coincide with the boundary temperatures between corresponding two element units in the rated operational status. The lengths L1-L6 are set, for example, so that the cross temperature Tx45 coincides with the boundary temperature Tb45. The lengths L1-L6 of all the element units 61-66 are set so that all the boundary temperatures coincide with the cross temperatures corresponding to it. As a result, the actual performance shown in a diagram (d) by a thick solid line becomes a continuous wave shape.

In another viewpoint, the lengths L1-L6 are set so that the peak magnitude of the actual performance which one of the element unit demonstrates is positioned on substantially a center of the temperature zone in which the element unit is expected to work in the rated operational status. All lengths L1-L6 are set to enable an effective operation. A plurality of element units 61-66 contained in the MCE 149 have several different lengths.

In this embodiment, in order to make the cross temperature and the boundary temperature coincides, the size of the element unit is designed and formed. The size of the element unit to be designed includes at least the length along a direction between the high-temperature end and the low-temperature end. By adjusting the length, the cross temperature and the boundary temperature can be coincided simply. At least one element unit has different length from the other element units. The cross temperature and the boundary temperature can be coincided by adopting the element units 61-66 with such an unevenly defined length.

Among an arbitrary pair of element units, the performance distribution of one element unit of the pair may be lower than the performance distribution of the other one element unit of the pair. A typical example is a case of two adjoining element units. In this case, the length of one element unit is longer than the length of the other element unit. That is, the length of the element unit with low performance distribution is set to be longer than the length of the element unit with high performance distribution. Thereby, the temperature zone according to performance distributions can be assigned to a plurality of element units. The larger a difference between the performance distributions is, the larger a difference between the lengths is set. For example, a difference Sp3-Sp4 between the performance distribution Sp3 of the element unit 63 and the performance distribution Sp4 of the element unit 64 is larger than a difference Sp3-Sp2 between the performance distribution Sp2 of the element unit 62 and the performance distribution Sp3 of the element unit 63. In order to adapt the above-mentioned differences of the performance distributions, a difference between the length L3 of the element unit 63 and the length L4 of the element unit 64 is set larger than a difference between the length L2 of the element unit 62 and the length L3 of the element unit 63. The length L4 of the element unit 64 is set longer than the length L2 of the element unit 62.

According to the MCE 149, the lengths of the element units are set so that the boundary temperatures in the rated operational status and the cross temperatures among the performance distributions coincide respectively. Thereby, even if there is differences among the performance distributions Sp1-Sp6, all of the element units 61-66 can demonstrate high levels of magneto-caloric effect in the regular operation condition. Therefore, all the element units 61-66 are used at high effectiveness. As a result, it is possible to realize high operating efficiency with low input electric power.

Second Embodiment

This embodiment is one of modifications based on a basic form provided by the preceding embodiment. In the above-mentioned embodiment, the boundary temperature and the cross temperature are adjusted to coincide each other by adjusting the lengths of the element units. Alternatively, in this embodiment, the boundary temperature and the cross temperature are adjusted to coincide with each other by selecting and adjusting Curie temperatures of the element units. Curie temperature of an element unit can be adjusted with various approaches, such as selecting material used, adjusting a material ratio, and adjusting a manufacturing process. In this embodiment, the structure shown in FIG. 1-FIG. 3 is employed. An MCE 249 illustrated in FIG. 8 is used.

(MCE for Second Embodiment)

Figure 8:
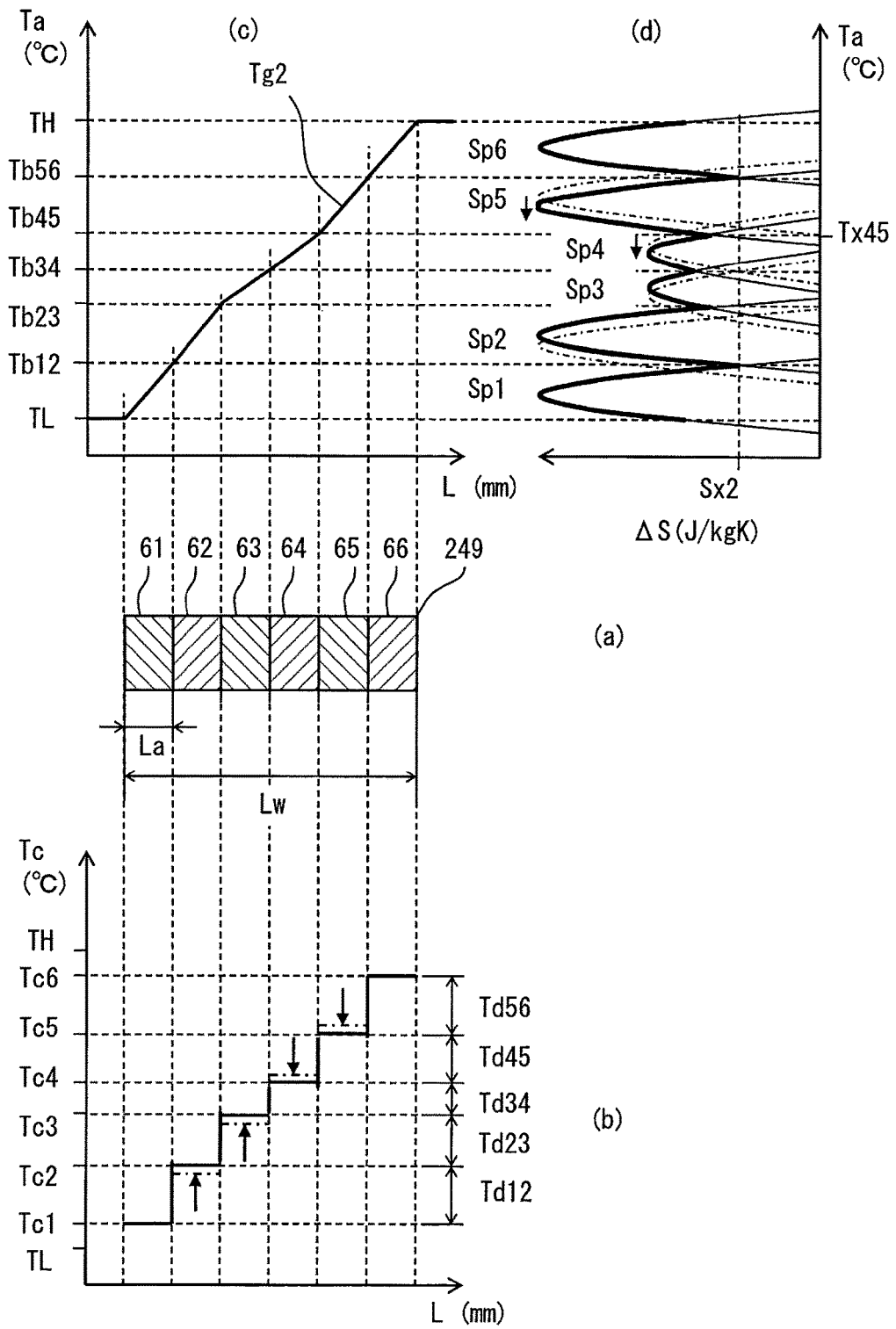
FIG. 8 is a combined graph showing characteristic of an MCE according to a second embodiment.

FIG. 8 shows the MCE 249 which can be used as the MCE 49 and 59. As shown in a diagram (a), the MCE 249 has the element units 61-66. The element units 61-66 have the same length La.

As shown in a diagram (b), Curie temperatures Tc1-Tc6 are not set at even intervals in the MCE 249. Among Curie temperatures Tc1-Tc6, there are temperature intervals Td12-Td56, respectively.

As shown in a diagram (d), magneto-caloric effect distributions Sp1-Sp6 which can be demonstrated by the plurality of element units, respectively, are not similar to each other. Especially the magneto-caloric effect which can be demonstrated by the element units 63 and 64 are lower than the magneto-caloric effect which can be demonstrated by the other element units 61, 62, 65, and 66. In other words, the performances of the element units 63 and 64 are lower than the performances of the element units 61, 62, 65, and 66.

Curie temperature Tc1, Tc2, Tc5, and Tc6 of the element units 61, 62, 65, and 66 with high performance are set to approach Curie temperatures Tc3 and Tc4 of the element units 63 and 64 with low performance. The element units 63 and 64 adjoin the element units 61, 62, 65, and 66 of which Curie temperatures are adjusted and set. For example, Curie temperatures Tc1 and Tc2 are shifted and set to a high-temperature side to approach Curie temperature Tc3. As a result, the performance distribution Sp2 on the diagram (d) shifts to the high-temperature side. Curie temperatures Tc6 and Tc5 are shifted and set to a low-temperature side to approach Curie temperature Tc4. As a result, the performance distribution Sp5 on the diagram (d) shifts to the low-temperature side.

Curie temperatures Tc3 and Tc4 of the element units 63 and 64 with low performance are set to approach a low performance side on the MCE 249. In the illustrated example, a center section of the MCE 249 has low performance. Curie temperatures Tc3 and Tc4 are set to approach the temperature on the center section of the MCE 249.

The temperature intervals Td12-Td56 are set unevenly. Unevenly set temperature intervals Td12-Td56 are given by setting Curie temperatures Tc1-Tc6 based on the performance of corresponding element units, and the performance distribution on the MCE 249. Specifically, Curie temperatures Tc1-Tc6 are set so that the temperature intervals Td12-Td56 satisfy Td34<Td23=Td45<Td12=Td56. The performance distributions Sp1-Sp6 are symmetrically arranged along the temperature axis. Accordingly, Curie temperatures Tc1-Tc6 are set so that the temperature intervals Td12-Td56 are symmetrically arranged.

In this embodiment, the lengths L1-L6 are set so that the cross temperatures of the performance distributions of two adjoining element units coincide with the boundary temperatures between corresponding two element units in the rated operational status. The lengths L1-L6 are set, for example, so that the cross temperature Tx45 coincides with the boundary temperature Tb45. The lengths L1-L6 of all the element units 61-66 are set so that all the boundary temperatures coincide with the cross temperatures corresponding to it. As a result, the actual performance shown in a diagram (d) by a thick solid line becomes a continuous wave shape.

In this embodiment, in order to make the cross temperature and the boundary temperature coincides, Curie temperature is adjusted and set. In order to coincide the cross temperatures and the boundary temperatures, Curie temperatures are assigned between the temperature TH on the high-temperature end, and the temperature TL on the low-temperature end in an unevenly divided manner. In a case that the MCE has at least three element units, a plurality of Curie temperatures are set to be distanced by temperature intervals Td12-Td56. At least one temperature interval differs from the other temperature intervals. Thereby, at least three Curie temperatures are assigned unevenly between the temperature TH on the high-temperature end and the temperature TL on the low-temperature end. By this structure, it is possible to use ranges before and behind the peak of the performance distributions.

The element units may include one element unit and the other two element units which are arranged on both sides of the one element unit in an adjoining manner. In this case, Curie temperatures may be set depending on differences among the performance distributions of the element units. An average of the performance distributions of two element units adjoining on one side may be lower than an average of the performance distributions of two element units adjoining on the other side. In this case, a temperature interval between Curie temperatures of two element units adjoining on the one side is smaller than a temperature interval between Curie temperatures of two element units adjoining on the other side. Curie temperatures are set so that the larger a difference between two averages is, the larger a difference between two temperature intervals becomes.

For example, there are two adjoining relations on both sides of the element unit 63, one is between the element unit 62 and the element unit 63, the other one is between the element unit 63 and the element unit 64. An average value of the performance distributions Sp3 and Sp 4 of the element units 63 and 64 is lower than the average value of the performance distributions Sp2 and Sp3 of the element units 62 and 63. According to a difference of the average values, a temperature interval Td34 between Curie temperature Tc3 and Curie temperature Tc4 is set smaller than a temperature interval Td23 between Curie temperature Tc2 and Curie temperature Tc3. The plurality of Curie temperatures are set so that the larger a difference between two averages is, the larger a difference between two temperature intervals becomes.

According to the MCE 249, Curie temperatures of the element units are set so that the temperature zones assigned for the element units with high performance are widened and the temperature zones assigned for the element units with low performance are narrowed. In other words, the temperature interval of Curie temperatures of adjoining element units is designed and set. Thereby, the boundary temperature in the rated operational status and the cross temperature of the performance distributions coincide with each other. Therefore, even if there is a difference among the performance distributions, all the element units 61-66 are used at high effectiveness.

Third Embodiment

This embodiment is one of modifications based on a basic form provided by the preceding embodiment. In the above-mentioned embodiment, the boundary temperature and the cross temperature are adjusted to coincide each other by adjusting the lengths of the element units or Curie temperatures of the element units. Alternatively, in this embodiment, the boundary temperature and the cross temperature are adjusted to coincide with each other by selecting and adjusting both the lengths of the element units and Curie temperatures of the element units. In this embodiment, the structure shown in FIG. 1-FIG. 3 is employed. An MCE 349 illustrated in FIG. 9 is used.

(MCE for Third Embodiment)

Figure 9:
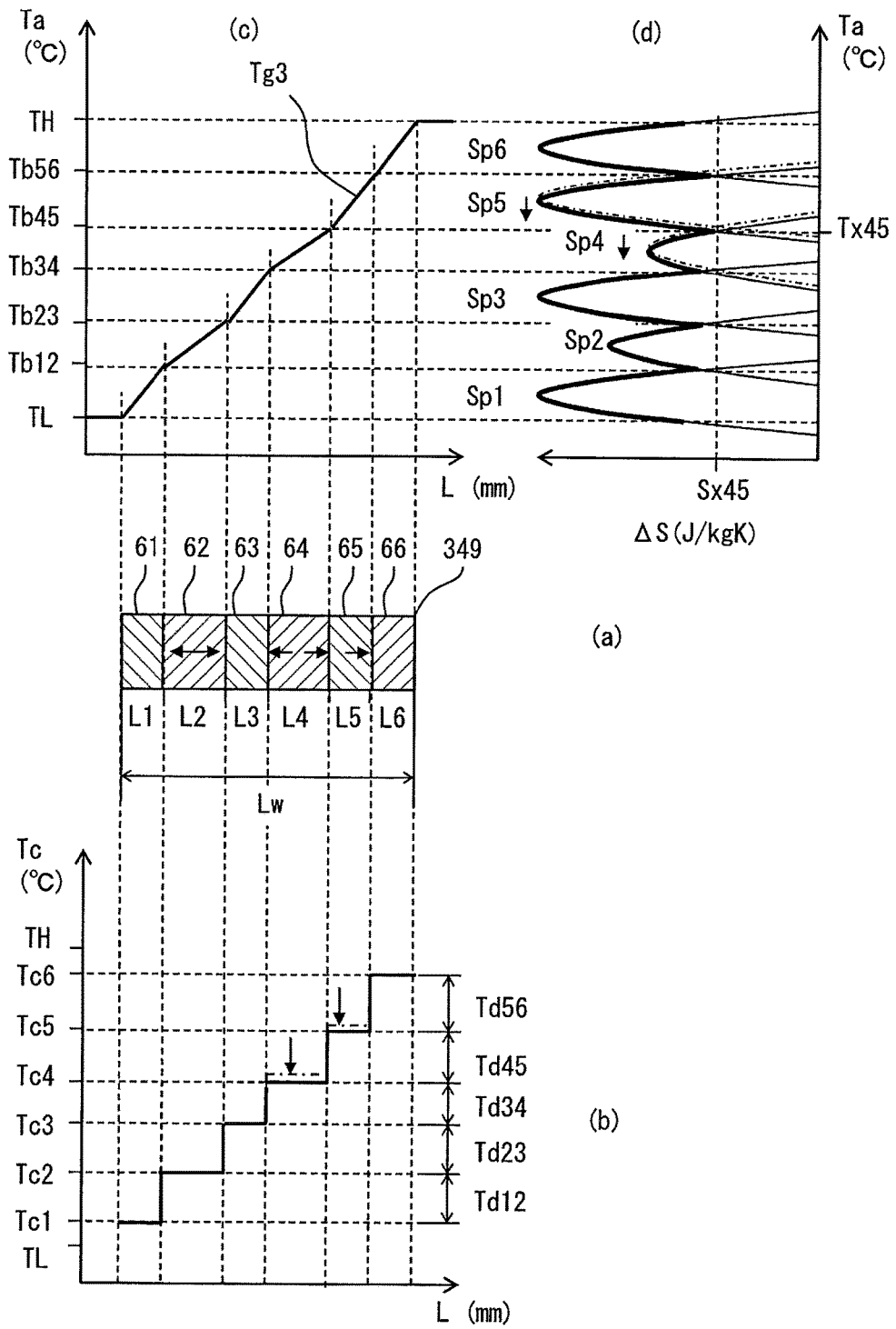
FIG. 9 is a combined graph showing characteristic of an MCE according to a third embodiment.

FIG. 9 shows the MCE 349 which can be used as the MCE 49 and 59. As shown in a diagram (a), the MCE 349 has the element units 61-66. In the illustrated example, a plurality of element units 61-66 have different lengths L1-L6, respectively. As shown in a diagram (b), Curie temperatures Tc1-Tc6 are not set at even intervals in the MCE 349. As shown in a diagram (d), magneto-caloric effect distributions Sp1-Sp6 which can be demonstrated by the plurality of element units, respectively, are not similar to each other. Especially the magneto-caloric effect which can be demonstrated by the element units 62 and 64 are lower than the magneto-caloric effect which can be demonstrated by the other element units 61, 63, 65, and 66.

The length L2 of the element unit 62 with low performance is set longer than the lengths L1 and L3 of the element units 61 and 63 with high performance. In this embodiment, the lengths L1-L3 are set so that the cross temperatures of the performance distributions of two adjoining element units coincide with the boundary temperatures between corresponding two element units in the rated operational status.

The lengths L4-L6 are set to realize, by collaborating with settings of Curie temperatures Tc4 and Tc5, that the cross temperatures coincides with the boundary temperatures. Curie temperatures Tc4 and Tc5 are set to realize, by collaborating with settings of the lengths L4 and L5, that the cross temperatures coincides with the boundary temperatures. That is, both the lengths and Curie temperatures of the element units are set up so that the boundary temperatures and the cross temperature coincide with each other. The lengths and Curie temperatures are set so that a plurality of element units have uneven lengths, and Curie temperatures of the element units give uneven temperature intervals.

The length L4 of the element unit 64 with low performance is set longer than the lengths L3, L5, and L6 of the element units 63, 65, and 66 with high performance.

An average of the performance distributions of two adjoining element units 64 and 65 is lower than an average of the performance distributions of two adjoining element units 65 and 66. In this case, a temperature interval Td45 between Curie temperatures of two element units 64 and 65 is smaller than a temperature interval Td56 between Curie temperatures of two element units 65 and 66. An average of the performance distributions of two adjoining element units 63 and 64 is substantially equal to an average of the performance distributions of two adjoining element units 64 and 65. A temperature interval Td34 between Curie temperatures of two element units 63 and 64 is substantially equal to a temperature interval Td45 between Curie temperatures of two element units 64 and 65. The temperature intervals Td12-Td56 are set unevenly. Curie temperatures Tc1-Tc6 are set so that the temperature intervals Td12-Td56 satisfy Td34=Td45<Td12=Td23<Td56.

In this embodiment, in order to coincide the cross temperature and the boundary temperature, the size, i.e., the lengths of the element units 64, 65, and 66 are designed and formed. Therefore, temperature intervals Td34, Td45, and Td56 are set to not depend only on average values of the performance distributions of two adjoining element units. For example, the temperature intervals are set by considering effect to approach the cross temperatures and the boundary temperatures caused by the unevenly defined length settings of the element units 64, 65, and 66. In a typical mode, both the lengths and Curie temperatures are set and used to approach the cross temperature and the boundary temperature.

In this embodiment, both the length and Curie temperature are set so that the cross temperature of the performance distributions of two adjoining element units coincide with the boundary temperature between corresponding two element units in the rated operational status. For example, the lengths L4 and L5 and Curie temperatures Tc4 and Tc5 are set to make the cross temperature Tx45 and the boundary temperature Tb45 coincide with each other. The lengths L1-L6 and Curie temperatures Tc1-Tc6 of all the element units 61-66 are set so that all the boundary temperatures coincide with the cross temperatures corresponding to it. As a result, the actual performance shown in a diagram (d) by a thick solid line becomes a continuous wave shape. According to the MCE 349, even if there is a difference among the performance distributions, all the element units 61-66 are used at high effectiveness.

Fourth Embodiment

This embodiment is one of modifications based on a basic form provided by the preceding embodiment. In the above-mentioned embodiments, six element units are connected to provide one MCE. One MCE may have arbitrary numbers of element units, such as two or more pieces For example, one MCE may have seven element units. In this embodiment, the structure shown in FIG. 1-FIG. 3 is employed. An MCE 449 illustrated in FIG. 10 and FIG. 11 is used.

(MCE for Fourth Embodiment)

Figure 10:
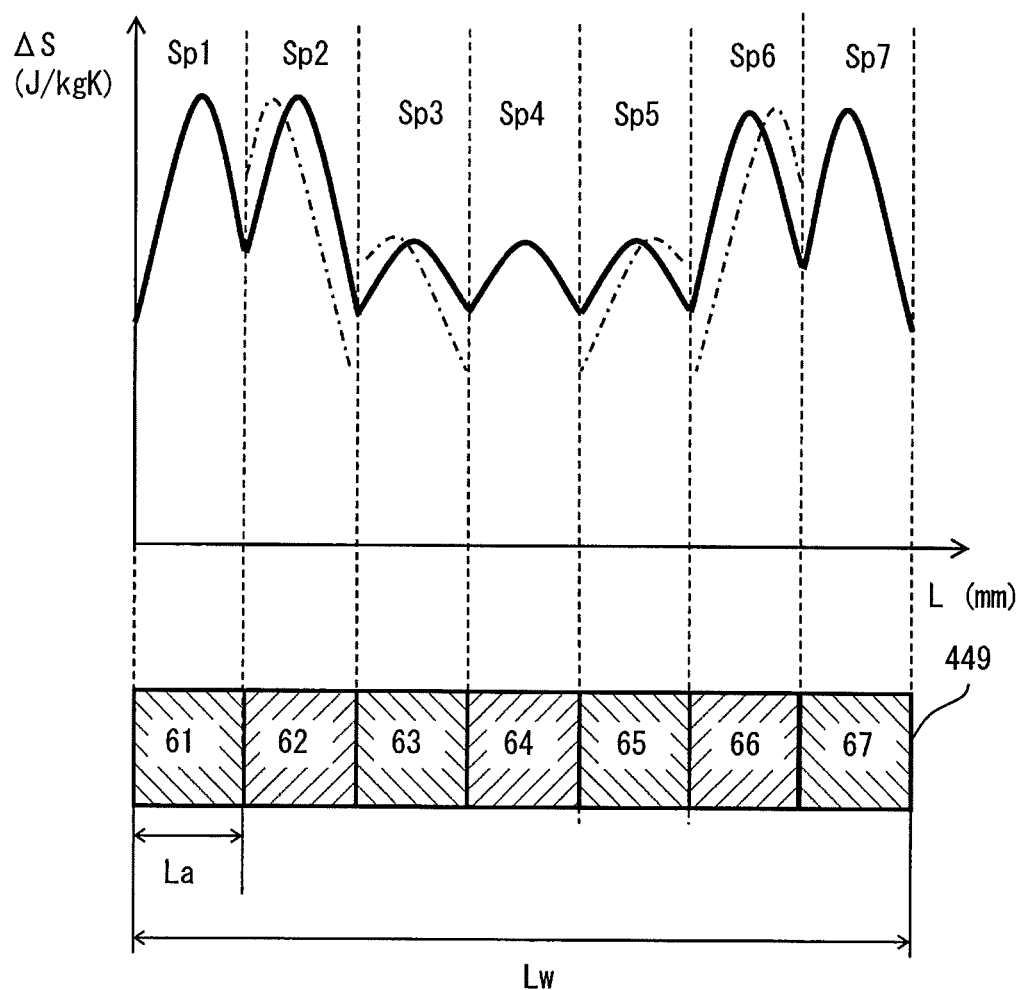
FIG. 10 is a graph showing characteristic of an MCE according to a fourth embodiment.

FIG. 10 shows the MCE 449 which can be used as the MCE 49 and 59. In addition, distributions of magneto-caloric-effect Delta-S on the MCE 449 are illustrated. The MCE 449 has a length Lw. The MCE 449 has a plurality of element units 61-67. The element units 61-67 have the same length La. Magneto-caloric effect distributions Sp1-Sp7 which can be demonstrated by the plurality of element units, respectively, are not similar to each other. Especially the magneto-caloric effect which can be demonstrated by the element units 63, 64 and 65 are lower than magneto-caloric effect which can be demonstrated by the other element units 61, 62, 66, and 67.

Figure 11:
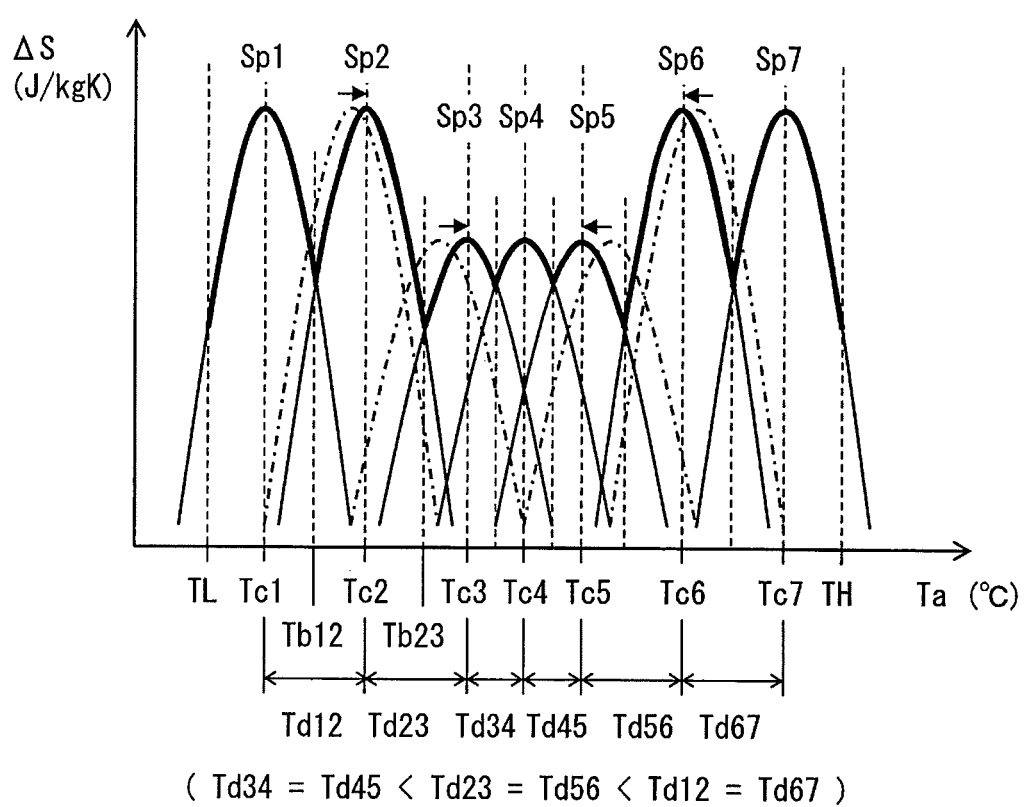
FIG. 11 is a graph showing characteristic of an MCE according to the fourth embodiment.

In FIG. 11, magneto-caloric-effect Delta-S of MCE 449 is illustrated by placing temperature on the horizontal axis. As shown in a diagram (b), Curie temperatures Tc1-Tc7 are not set at even intervals in the MCE 449. Among Curie temperatures Tc1-Tc7, there are temperature intervals Td12-Td67, respectively. The temperature intervals Td12-Td56 are set unevenly.

Curie temperatures Tc1-Tc7 are set so that the temperature intervals Td12-Td67 satisfy Td34=Td45<Td23=Td56<Td12=Td67. The performance distributions Sp1-Sp7 are symmetrically arranged along the temperature axis. Accordingly, Curie temperatures Tc1-Tc7 are set so that the temperature intervals Td12-Td67 are symmetrically arranged.

In this embodiment, Curie temperatures Tc1-Tc7 are set so that the cross temperatures of the performance distributions of two adjoining element units coincide with the boundary temperatures between corresponding two element units in the rated operational status. Curie temperatures Tc1-Tc7 are set so that the cross temperature between the performance distributions Sp1 and Sp2 coincides with the boundary temperature Tb12 in the rated operational status. Curie temperatures Tc1-Tc7 are set so that the cross temperature between the performance distributions Sp2 and Sp3 coincides with the boundary temperature Tb23 in the rated operational status. Curie temperatures Tc1-Tc7 are set so that all the boundary temperatures coincide with the cross temperatures corresponding to it. As a result, the actual performance shown by a thick solid line becomes a continuous wave shape. According to the MCE 449, even if there is a difference among the performance distributions, all the element units 61-67 are used at high effectiveness.

Fifth Embodiment

This embodiment is one of modifications based on a basic form provided by the preceding embodiment. In this embodiment, unevenly-distanced-settings of Curie temperature is adopted in one part of the MCE, and uneven settings of the lengths of element units is adopted in the other one part of the MCE. In this embodiment, the structure shown in FIG. 1-FIG. 3 is employed. An MCE 549 illustrated in FIG. 12 and FIG. 13 is used.

(MCE for Fifth Embodiment)

Figure 12:
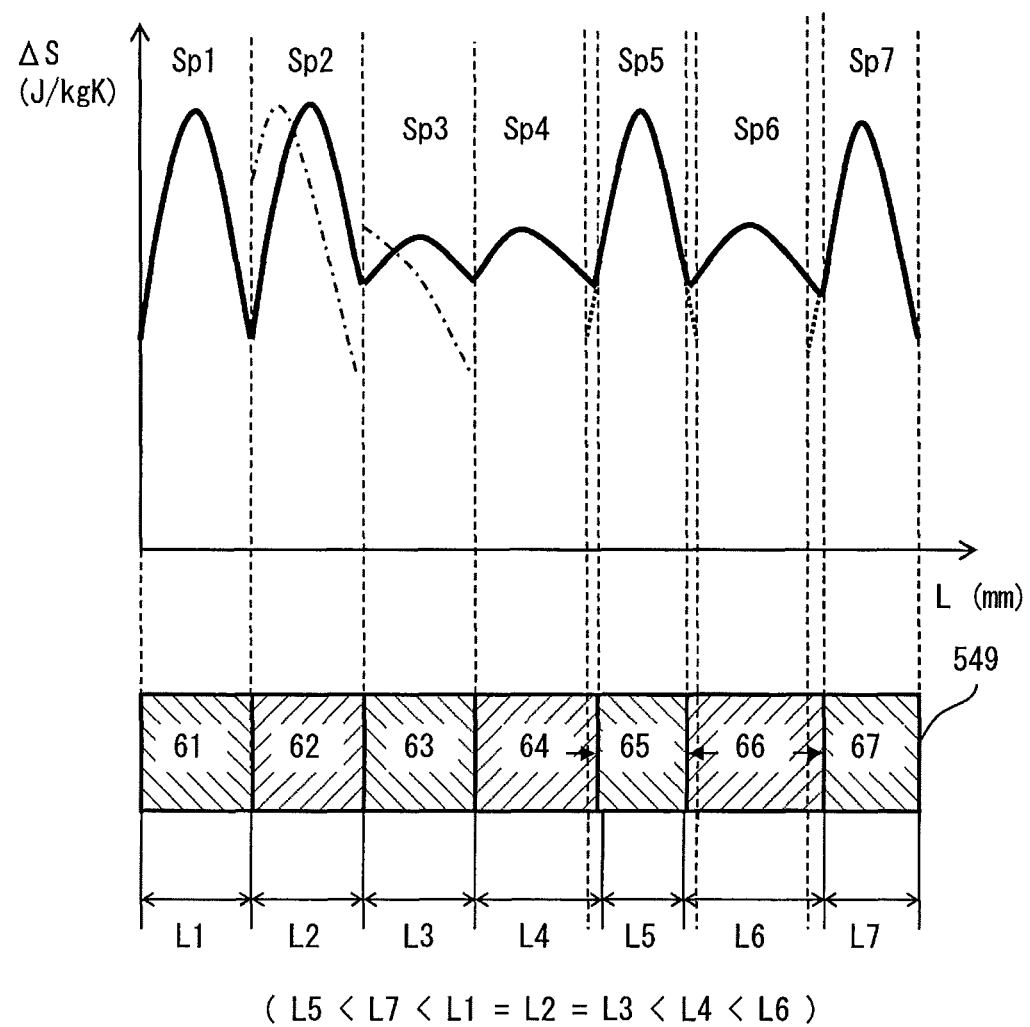
FIG. 12 is a graph showing characteristic of an MCE according to a fifth embodiment.
Figure 13:
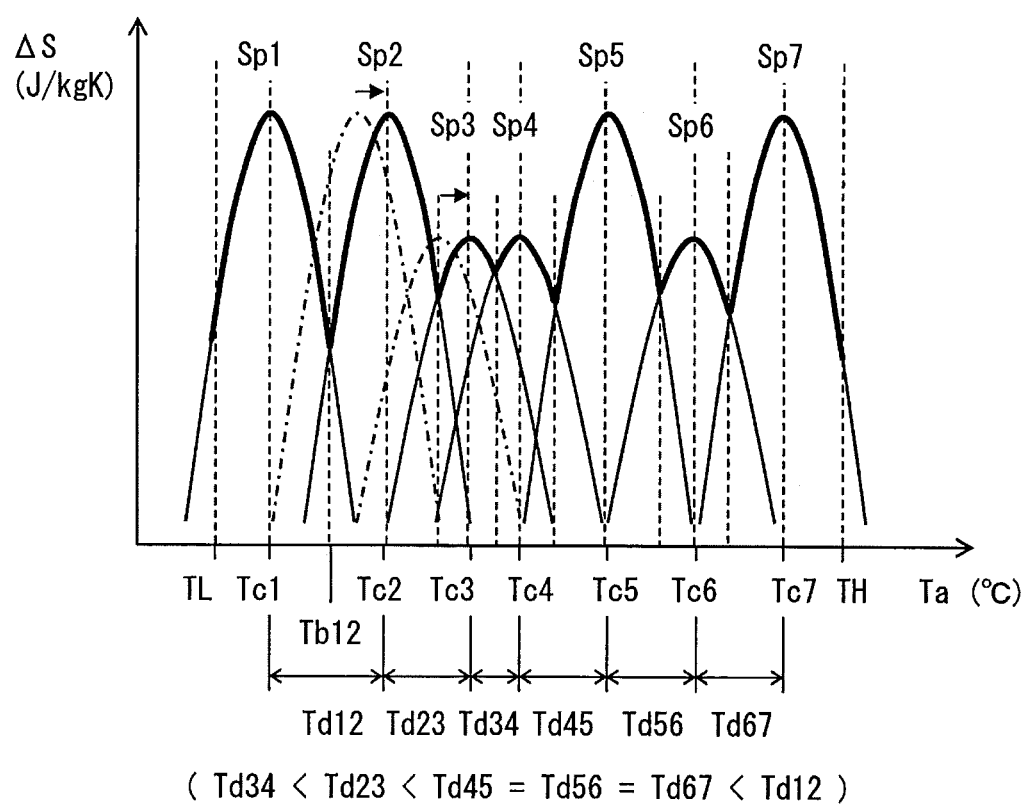
FIG. 13 is a graph showing characteristic of an MCE according to the fifth embodiment.

FIG. 12 shows the MCE 549 which can be used as the MCE 49 and 59. In addition, distributions of magneto-caloric-effect Delta-S on the MCE 549 are illustrated. The element units 61-67 have lengths L1-L7, respectively. Magneto-caloric effect distributions Sp1-Sp7 which can be demonstrated by the plurality of element units, respectively, are not similar to each other. Especially the magneto-caloric effect which can be demonstrated by the element units 63, 64 and 66 are lower than magneto-caloric effect which can be demonstrated by the other element units 61, 62, 65, and 67.

Specifically, the lengths L1-L7 are set to satisfy the following relationship: L5<L7<L1=L2=L3<L4<L6. The lengths L1-L3 are equal to each other. The lengths L4-L7 are set so that the cross temperatures among them coincide with the boundary temperatures among them.

In FIG. 13, magneto-caloric-effect Delta-S of MCE 549 is illustrated by placing temperature on the horizontal axis. Curie temperatures Tc1-Tc7 are not set at even intervals. Among Curie temperatures Tc1-Tc7, there are temperature intervals Td12-Td67, respectively. The temperature intervals Td12-Td67 are set unevenly.

Curie temperatures Tc1-Tc7 are set so that the temperature intervals Td12-Td67 satisfy Td34<Td23<Td45=Td56=Td67<Td12. Curie temperatures Tc4-Tc7 are set so that the temperature intervals Td45, Td56, and Td67 among them are equal to each other. Curie temperatures Tc1-Tc3 are set so that each one of the cross temperatures among the element units 61-63 coincides with corresponding one of boundary temperatures. For example, Curie temperature Tc2 is set so that the temperature interval Td12 is larger than the temperature interval Td45. Curie temperature Tc3 is set so that the temperature interval Td23 is smaller than the temperature interval Td45. Here, the temperature interval Td45 indicates an even temperature interval given by assigning uniformly a plurality of element units 61-67 between a temperature range TH-TL.

Coincidences between the cross temperatures and the boundary temperatures are realized by setting Curie temperature in the left half part of the MCE 549. Coincidences between the cross temperatures and the boundary temperatures are realized by setting the lengths of the element units in the right half part of the MCE 549. As a result, the actual performance shown by a thick solid line becomes a continuous wave shape. According to the MCE 549, even if there is a difference among the performance distributions, all the element units 61-67 are used at high effectiveness.

Other Embodiments

The present disclosure is not limited to the above embodiments, and the present disclosure may be practiced in various modified embodiments. The present disclosure is not limited to the above combination, and disclosed technical means can be practiced independently or in various combinations. Each embodiment can have an additional part. The part of each embodiment may be omitted. The part of embodiment may be replaced or combined with the part of the other embodiment. The configurations, functions, and advantages of the above-mentioned embodiment are just examples. The technical scope of the present disclosure is not limited to the descriptions and the drawings. Some extent of the disclosure may be shown by the scope of claim, and also includes the changes, which is equal to and within the same range of the scope of claim.

For example, in the above-mentioned embodiments, lengths L1-L6 and L7 of the element units 61-66, and 67 along the temperature gradient direction, which are one of dimension of the element units 61-66, and 67, are adjusted. Alternatively or additionally, it may be employed to adjust the other dimension, such as a thickness of the element units 61-66 and 67. For example, in a case of having a channel for the heat exchange medium in the element unit, it may be employed to adjust the substantial dimension of the element unit by adjusting a size of the channel.

In the embodiments, length and/or Curie temperature is designed so that all of element units arranged in series along the temperature gradient direction can function at high effectiveness in the rated operational status. Alternatively, length and/or Curie temperature may be designed so that only a part of element units can function at high effectiveness. For example, one MCE may have an element unit for starting from an initial temperature, and a plurality of element units for the rated operation. In this case, the effectiveness of the element units for starting may become low at the rated operational status.

In the embodiments, the MHP 2 is shown as one example of the thermo-magnetic cycle apparatus. Alternatively, the present disclosure may be applied to a thermo-magnetic engine apparatus which is another one of the thermo-magnetic cycle apparatus. For example, a thermo-magnetic engine apparatus can be provided by adjusting the phase angle of the magnetic-field change and the heat transport medium flow on the MHP 2.

In the preceding embodiments, the present disclosure is applied to the air-conditioner for vehicle. Alternatively, the present disclosure may be applied to an air-conditioner for residences. Further alternatively, the present disclosure may be utilized to provide a hot-water-supply apparatus which heats water. In the embodiments, the MHP 2 uses the outside air as the main heat source. Alternatively, the other heat sources, such as water or soil, may be used as the main heat source.

In the embodiments, the MCE generates heat in response to applying the external magnetic field, and absorbs heat in response to removing the external magnetic field. Alternatively, it is possible to use an MCE which absorbs heat in response to applying the external magnetic field, and generates heat in response to removing the external magnetic field.

In the embodiments, the magnetic-field applying and removing means is provided by rotating the permanent magnet. Alternatively, the means may be provided by moving the MCE. The permanent magnet may be replaced with an electromagnetic device.

In the embodiments, water is used to provide the heat transport medium for operating the MCE 49 and 59 as the AMR cycle and the heat transport medium for conveying cold and/or warm temperature generated by the MHP 2 to the heat exchangers 3 and 4. Alternatively, the heat transport medium for operating the MCE 49 and 59 as the AMR cycle and the heat transport medium for conveying cold and/or warm temperature to the heat exchangers 3 and 4 may be separated and isolated. For example, a water circuit and a pump for conveying warm temperature generated at the high temperature end 11 may be formed independently from the MHP 2.

In the embodiments, the pump 30 is arranged center, and the MCD units 40 and 50 are arranged on the both sides. Alternatively, an MHP 2 may be formed by a half of the pump 30 and one side part of the MCD unit. For example, an MHP 2 may be provided by the right half of the pump 30 and the MCD unit 40. In this case, the heat exchanger 4 may be disposed between the pump 30 and the MCD unit 40.

In the embodiments, the multi-cylinder pump is provided by the swash plate type pump or the radial piston pump. Alternatively, the other type of displacement pump may be used. In the embodiments, one cylinder of the pump is disposed to be associated with one of the work chambers 46 and 56. Alternatively, a plurality of cylinders and one work chamber may be disposed to be associated with, one cylinder and a plurality of work chambers may be disposed to be associated with, or a plurality of cylinders and a plurality of work chambers may be disposed to be associated with.

Various physical quantities may be used as an index for measuring a magneto-caloric effect. For example, magnitudes of the magneto-caloric effect may be indicated by an isothermal entropy change or an adiabatic temperature change under a process varying a magnetic field.

Means and functions of the control device may be provided by only software, only hardware or a combination of the software and the hardware. For example, the control device may be made of an analogue circuit.

A magneto-caloric element in which a plurality of element units 61-66 or 61-67, each of which has different Curie temperatures are arranged in series, is provided in the above-mentioned embodiments. A plurality of performance distributions Sp1-Sp6, and Sp7 indicate values of magnetocaloric-effect Delta-S, which can be demonstrated by the element units 61-66, and 67, respectively. At least one of the performance distributions differs from the others. The sizes L1-L6, and L7 of the element units 61-66, and 67 and/or Curie temperatures Tc1-Tc6, and Tc7 of the element units 61-66, and 67 are set so that the boundary temperatures Tb12-Tb56 and Tb67 which appear in the rated operational status between two adjoining element units and the cross temperatures, for example, Tx45, at which the performance distributions corresponding to two element units cross may coincide with each other. According to this structure, the sizes of the element units and/or Curie temperatures of the element units are set up so that the boundary temperatures and the cross temperature may coincide with each other. By adjusting the boundary temperatures and the cross temperatures to coincide with each other, regions higher than crossing points of a plurality of performance distributions are used in the rated operational status. Accordingly, even if the heights of the performance distributions of a plurality of element units differs at least in a part thereof, in the rated operational status, a plurality of element units still works at high effectiveness.

What is claimed is:

1. A magneto-caloric element having a high-temperature end where the magneto-caloric element becomes a high temperature and a low-temperature end where the magneto-caloric element becomes a low temperature, comprising:
    a plurality of element units having different Curie temperatures and being arranged along a direction of temperature distribution between the high-temperature end and the low-temperature end to form the magneto-caloric element, wherein
    the element units are operated in predetermined temperature distributions between the high-temperature end and the low-temperature end when the magneto-caloric element is activated, and wherein
    the plurality of element units are capable of demonstrating magneto-caloric effects which can be represented by a plurality of performance distributions on a performance graph, respectively, and wherein at least one of the performance distributions in the performance graph differs in height from the other performance distributions in the performance graph, and wherein
    the size of each element unit of the plurality of element units and/or the Curie temperature of each element unit of the plurality of element units are set so that the boundary temperature which appears between two adjoining element units coincides with the cross temperature at which the respective performance distributions of each of two adjoining element units cross each other on the corresponding performance distributions on the performance graph, and wherein
    a length of at least one element unit of the plurality of element units differs from a length of the other element units of the plurality of element units, and wherein
    among an arbitrary pair of element units, the performance distribution of one element unit of the pair has a lower magneto-caloric effect than the performance distribution of the other element unit of the pair in the performance graph, and wherein
    the length of the one element unit is longer than the distance between the high temperature end and the low temperature end of the other element unit along the length of the other element unit.

2. The magneto-caloric element in claim 1, wherein
    the plurality of element units are configured such that the larger the difference in the magneto-caloric effect between the performance distributions of the arbitrary pair of element units on the performance graph, the larger the distance between the high-temperature end and the low-temperature end along the length at least one of the one element unit of the pair and the other element unit of the pair is set.

3. The magneto-caloric element in claim 1, wherein
    a magnitude of the magneto-caloric effect is indicated by an isothermal entropy change or an adiabatic temperature change under a process varying a magnetic field.

4. The magneto-caloric element in claim 1, wherein
    the element units demonstrate continuous performance distributions higher in the magneto-caloric effect than a predetermined performance.

5. A magneto-caloric element having a high-temperature end where the magneto-caloric element outputs a high temperature and a low-temperature end where the magneto-caloric element outputs a low temperature, comprising:
    a plurality of element units having different Curie temperatures and being arranged along a direction of temperature distribution between the high-temperature end and the low-temperature end to form the magneto caloric element, wherein
    the element units are operated in predetermined temperature distributions between the high-temperature end and the low-temperature end when the magneto-caloric element is activated, and wherein
    the plurality of element units are capable of demonstrating magneto-caloric effects which can be represented by a plurality of performance distributions on a performance graph, respectively, and wherein at least one of the performance distributions in the performance graph differs in height from the other performance distributions in the performance graph, and wherein
    the size of each element unit of the plurality of element units and/or the Curie temperature of each element unit of the plurality of element units are set so that the boundary temperature which appears between two adjoining element units coincides with the cross temperature at which the respective performance distributions of each of two adjoining element units cross each other on the corresponding performance distributions on the performance graph, and wherein
    the plurality of element units includes at least three element units, and wherein
    Curie temperatures of the at least three element units are apart from each other by temperature intervals, and wherein
    the temperature intervals include at least one temperature interval which differs from the other temperature intervals, and wherein
    the plurality of element units includes one element unit and two adjoining element units which are arranged on both sides of the one element unit in an adjoining manner, and wherein
    an average of the performance distributions of the two adjoining element units adjoining on one side of the one element unit is lower than an average of the performance distributions of the two element units adjoining on the other side of the one element unit, and wherein
    a temperature interval between Curie temperatures of the two element units adjoining on one side of the one element unit is smaller than a temperature interval between Curie temperatures of two element units adjoining on the other side of the one element unit.

6. The magneto-caloric element in claim 5, wherein
the larger the difference in the magneto-caloric effect between the averages is, the larger the difference in the temperature between the temperature intervals is.
7. The magneto-caloric element in claim 5, wherein
a magnitude of the magneto-caloric effect is indicated by an isothermal entropy change or an adiabatic temperature change under a process varying a magnetic field.
8. The magneto-caloric element in claim 5, wherein
the element units demonstrate continuous performance distributions higher in the magneto-caloric effect than a predetermined performance.

\* \* \* \* \*